US012643775B2

(12) United States Patent
Azeredo et al.

(10) Patent No.: US 12,643,775 B2
(45) Date of Patent: Jun. 2, 2026

(54) HOIST SYSTEM AND PROCESS IMPLEMENTING AN EMERGENCY STOPPING BRAKE

(71) Applicant: BREEZE-EASTERN LLC, Whippany, NJ (US)

(72) Inventors: Ian Azeredo, Whippany, NJ (US); Brianna Kaminski, Whippany, NJ (US); Neal Wagner, Whippany, NJ (US); Omar Bekheet, Whippany, NJ (US); Patrick Doyle, Whippany, NJ (US)

(73) Assignee: BREEZE-EASTERN LLC, Whippany, NJ (US)

( * ) Notice: Subject to any disclaimer, the term of this patent is extended or adjusted under 35 U.S.C. 154(b) by 0 days.

(21) Appl. No.: 17/722,617

(22) Filed: Apr. 18, 2022

(65) Prior Publication Data

US 2022/0332553 A1 Oct. 20, 2022

Related U.S. Application Data

(60) Provisional application No. 63/175,778, filed on Apr. 16, 2021.

(51) Int. Cl.
B66D 1/58 (2006.01)
B64D 1/02 (2006.01)
(Continued)

(52) U.S. Cl.
CPC ................ B66D 1/58 (2013.01); B64D 1/02 (2013.01); B66D 1/525 (2013.01); *B66C 1/40* (2013.01)

(58) Field of Classification Search
CPC .......... B66D 1/58; B66D 1/425; B66D 1/485; B66D 3/18; B66D 3/20; B66D 5/14; (Continued)

(56) References Cited

U.S. PATENT DOCUMENTS 3,353,792 A    11/1967 Aitken
3,744,759 A  *  7/1973 Jennings .................. B66D 5/00
                                                      188/69
(Continued)

FOREIGN PATENT DOCUMENTS

CN          110127548 A  *  8/2019
DE            1456411 A1     3/1969
(Continued)

OTHER PUBLICATIONS

International Patent Application No. PCT/US2022/025170; Int'l Search Report and the Written Opinion; dated Aug. 1, 2022; 10 pages.

*Primary Examiner* — Anna M Momper
*Assistant Examiner* — Henrix Soto
(74) *Attorney, Agent, or Firm* — BakerHostetler

(57) ABSTRACT

A hoist system includes a hook; a cable connected to the hook; a motor configured to move the hook and the cable; an overload protection device (OLPD) configured to limit loads imparted on one or more of the hook, the cable, and the motor. The hoist system further includes an emergency brake system configured to stop movement of at least the cable, where the emergency brake system is configured to operate in response to a manual control or automatically in response to a controller.

15 Claims, 14 Drawing Sheets

(51) Int. Cl.
  *B66C 1/40* (2006.01)
  *B66D 1/52* (2006.01)
(58) Field of Classification Search
  CPC ... B66D 5/30; B66D 5/24; B66D 5/00; B66D
  5/02; B66D 5/16; B66D 5/18; B66D
  5/26; B66D 2700/03; B66C 1/40; B66C
  13/30; B64D 1/02; B64D 1/22; F16D
  59/02; F16D 2069/004; F16D 2121/02;
  F16D 2121/14; F16D 2121/18; F16D
  2121/20; F16D 2127/008
  USPC ........................................................ 254/269
  See application file for complete search history.

(56) References Cited

U.S. PATENT DOCUMENTS

| | | | | |
|---|---|---|---|---|
| 4,434,971 | A | 3/1984 | Cordrey | |
| 6,520,299 | B2 | 2/2003 | Rimann et al. | |
| 7,896,315 | B2 * | 3/2011 | Faust | B66D 1/26 |
| | | | | 254/294 |
| 7,970,520 | B2 * | 6/2011 | Gross | B66D 1/58 |
| | | | | 212/278 |
| 9,221,656 | B2 * | 12/2015 | Codd | B66D 1/48 |
| 10,112,810 | B2 * | 10/2018 | Golder | H02K 7/11 |
| 10,571,365 | B2 * | 2/2020 | Bryson | B66D 1/485 |
| 10,604,229 | B2 | 3/2020 | Lopez et al. | |
| 10,654,695 | B1 * | 5/2020 | Lopes | B66D 1/12 |
| 2017/0066634 | A1 * | 3/2017 | Kawai | B66D 5/02 |
| 2018/0251349 | A1 * | 9/2018 | Ijadi-Maghsoodi | F16H 1/46 |
| 2018/0339891 | A1 | 11/2018 | Ijadi-Maghsoodi et al. | |
| 2019/0077642 | A1 * | 3/2019 | Huang | H02H 3/006 |
| 2019/0089273 | A1 * | 3/2019 | Kirby | F16D 65/28 |
| 2019/0119079 | A1 * | 4/2019 | Krause | H02P 3/22 |
| 2019/0193998 | A1 * | 6/2019 | Ladra | B66C 13/30 |
| 2019/0337778 | A1 * | 11/2019 | G | B66D 1/485 |
| 2020/0131011 | A1 * | 4/2020 | Holmberg | B66D 1/485 |
| 2020/0207596 | A1 * | 7/2020 | Hausladen | B66D 1/48 |
| 2020/0309216 | A1 * | 10/2020 | Maghoodi | B64D 1/22 |

FOREIGN PATENT DOCUMENTS

| | | | | |
|---|---|---|---|---|
| DE | 19645811 | A1 * | 6/1998 | |
| DE | 19745087 | C1 * | 10/1998 | |
| DE | 10246280 | B3 * | 7/2004 | |
| EP | 2957788 | A1 | 12/2015 | |
| WO | WO-2020088879 | A1 * | 5/2020 | |

* cited by examiner

HOIST SYSTEM AND PROCESS IMPLEMENTING AN EMERGENCY STOPPING BRAKE

CROSS-REFERENCE TO RELATED APPLICATIONS

This application claims the benefit from U.S. Provisional Application No. 63/175,778 filed on Apr. 16, 2021, which is hereby incorporated by reference in its entirety for all purposes as if fully set forth herein.

FIELD OF THE DISCLOSURE

The disclosure relates to a hoist system implementing an emergency stopping brake. The disclosure further relates to a hoist process implementing an emergency stopping brake.

BACKGROUND

Helicopter hoist equipment typically includes a lifting device such as a hoist, which is attached to the helicopter, a hoist cable, and a hook located at a distal end of the hoist cable for direct or indirect attachment to a person, animal, and/or one or more objects (load) for rescue, transport, lift, and/or the like. The helicopter hoist equipment usually has a rotary drum for winding in and out the hoist cable that serves to lift or transport the load. A crew member in the helicopter typically controls the helicopter hoist equipment including raising and lowering of the hook.

The environment in which the helicopter or other aircraft operates as well as the lifting device and the load that is being lifted is highly dynamic and includes or is subjected to various forces, accelerations, movements, and/or the like. A common issue with this environment is that portions of the lifting device may slip responsive to mechanical systems attempting to address various load forces. However, lifting device slip presents a risk to safe operation of the helicopter as well as presenting a safety issue for the load.

Accordingly, a system and process to stop slipping of a lifting device is needed to ensure safe operation of the aircraft and a safety of the load.

SUMMARY OF THE DISCLOSURE

The foregoing needs are met, to a great extent, by the disclosure, wherein in one aspect a hoist system and hoist process having an emergency brake are provided.

One general aspect includes a hoist system that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; and where the emergency brake system includes brake components.

One general aspect includes a hoist system that includes a hook; a cable connected to the hook; a motor configured to move the hook and the cable; an overload protection device (OLPD) configured to limit loads imparted on one or more of the hook, the cable, and the motor; and an emergency brake system configured to stop movement of at least the cable, where the emergency brake system is configured to operate in response to one of the following: a manual control or automatically in response to a controller.

One general aspect includes a hoist system that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; where the emergency brake system includes brake components; where the brake components are connected directly or indirectly to a cable storage drum; and where when the emergency brake system is actuated, the brake components prevent rotation of a cable storage drum.

One general aspect includes a hoist system process that includes providing a hook; providing a cable connected to the hook; providing a motor configured to move the hook and the cable; limiting loads imparted on one or more of the hook, the cable, and the motor with an overload protection device (OLPD); and stopping movement of at least the cable with an emergency brake system, where the emergency brake system is configured to operate in response to one of the following: a manual control or automatically in response to a controller; and where the emergency brake system includes brake components.

One general aspect includes a hoist system process that includes providing a hook; providing a cable connected to the hook; providing a motor configured to move the hook and the cable; limiting loads imparted on one or more of the hook, the cable, and the motor with an overload protection device (OLPD); and stopping movement of at least the cable with an emergency brake system, where the emergency brake system is configured to operate in response to one of the following: a manual control or automatically in response to a controller.

One general aspect includes a hoist system process that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; where the emergency brake system includes brake components; where the brake components are connected directly or indirectly to a cable storage drum; and where when the emergency brake system is actuated, the brake components prevent rotation of a cable storage drum.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the disclosure. It is important, therefore, that the claims be regarded as including such equivalent constructions insofar as they do not depart from the spirit and scope of the disclosure.

Reference herein to an "aspect," "example," or similar formulations means that a particular feature, structure, operation or characteristic described in connection with the "aspect" or "example," is included in at least one implementation in this description. Thus, the appearance of such phrases or formulations is this application may not necessarily all refer to the same example. Further, various particular features, structures, operations, or characteristics may be combined in any suitable manner in or more examples.

DETAILED DESCRIPTION

Figure 1:
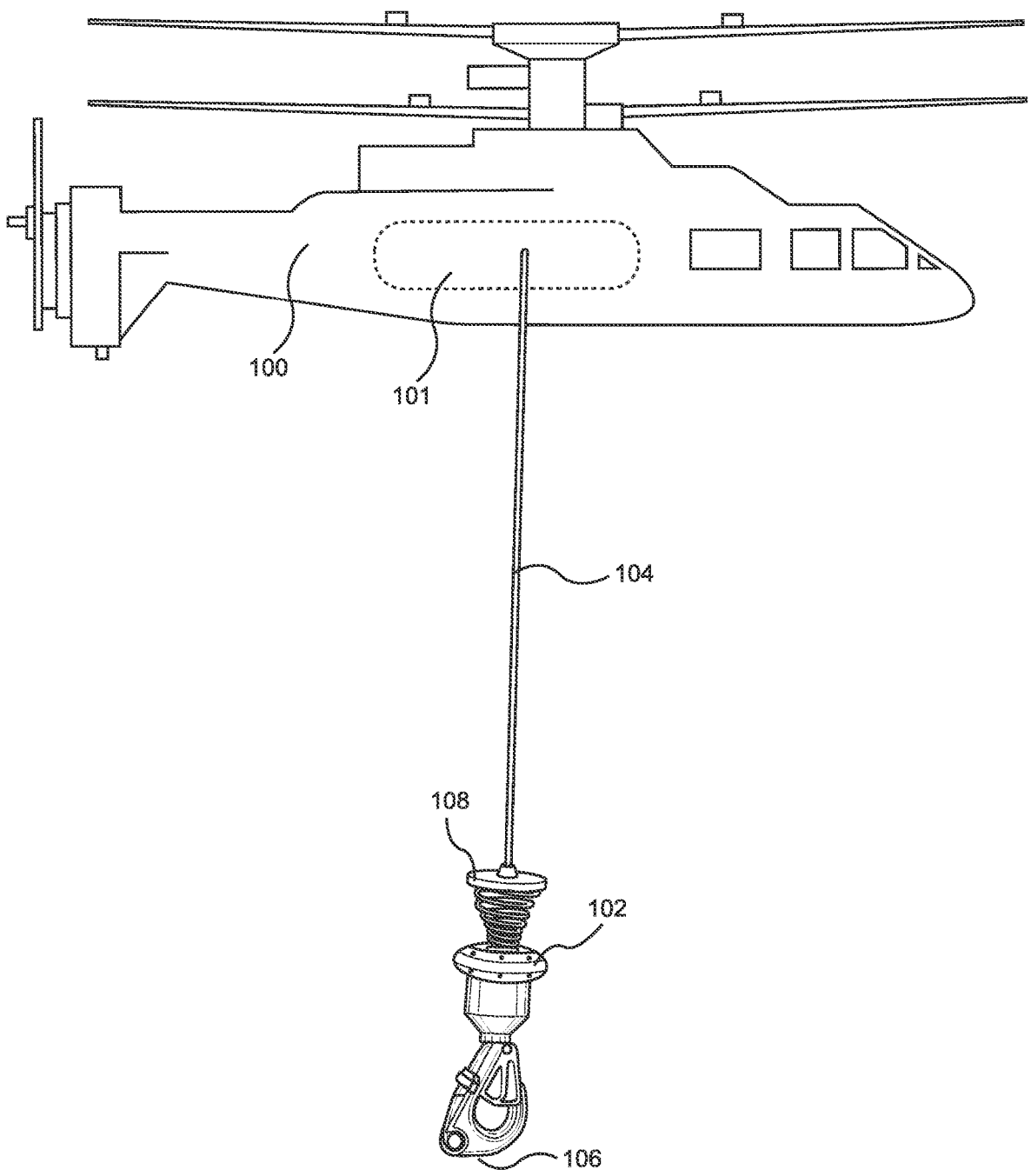
FIG. 1 illustrates a helicopter with an exemplary helicopter hoist system in accordance with aspects of the disclosure.

The disclosure will now be described with reference to the drawing Figures, in which like reference numerals refer to like parts throughout. Aspects of the disclosure advantageously provide a hoist system and hoist process having an emergency brake.

A rescue hoist typically includes an ascending or descending length of cable, which is connected to a storage drum on the helicopter. Tensioning mechanisms may provide proper cable management and tightness of cable on the storage drum, or otherwise manage the routing of the cable towards driving components. Through various means the storage drum may be connected to a motor assembly which may be controlled hydraulically, pneumatically, electrically, and/or the like to allow fixed or variable speeds from various inputs located within the helicopter. The motor assembly may be coupled to a reduction gearbox or similar mechanism prior to connection to the cable storage drum. In some aspects, the rescue hoist may also feature an Overload Protection Device (OLPD) that may be located in-line between reduction mechanisms, braking mechanisms, a storage drum, and/or the like. The Overload Protection Device (OLPD) may allow on-demand decoupling of the rescue hoist cable from the hoist mechanical drivetrain components. The Overload Protection Device (OLPD) may be electrically actuated, mechanically actuated, and/or the like.

The Overload Protection Device (OLPD) may be located directly within the carrying load path. In order to mitigate safety considerations involving the Overload Protection Device (OLPD), the system and process of the disclosure may implement a rescue hoist with a secondary braking mechanism. The secondary braking mechanism may be manually activated through mechanical or electrical means to directly couple braking force to the hoist system such as the hoist cable storage drum device.

The system and process of the disclosure may implement the secondary braking mechanism with a brake disc. The system and process of the disclosure may implement the secondary braking mechanism coupled to the hoist cable storage device. The brake disc of the secondary braking mechanism may include serrations, ramps, other non-planar structures, and/or the like to increase frictional coupling. The system and process of the disclosure may implement the secondary braking mechanism with a mating brake pad assembly that may be retained by mechanical hardware. Moreover, the system and process of the disclosure may implement the secondary braking mechanism with the mating brake pad assembly that may be compressed via potential energy. The potential energy of the brake pad may be backed with compression springs, pneumatic pressure, hydraulic pressure, and/or the like. In other aspects, the system and process of the disclosure may implement the secondary braking mechanism with the mating brake pad assembly that may be positively engaged onto the brake drum by electrical actuation.

In aspects, the system and process of the disclosure may implement the secondary braking mechanism with the mating brake pad assembly such that it may be engaged via one-time human-activated switches within the aircraft, which may or may not feature dual action or triple action redundancies. Further redundancies may be integrated such as not enabling arming circuitry unless a hoist load detected, if aircraft flight is detected (weight on wheels switch signals "OFF"), and/or the like. In aspects, the system and process of the disclosure may implement the secondary braking mechanism such that when a one-time activated switch is activated it may act as a release, where potential energy retaining the brake pad is released and the brake pad then positively contacts the brake drum. In aspects, the system and process of the disclosure may implement the secondary braking mechanism such that the brake pad and the brake disc may be mechanically replaceable, resettable, and/or the like. In aspects, the system and process of the disclosure may implement the secondary braking mechanism such that the actuation mechanism may be electrical, pyrotechnic, non-explosive instantaneous actuation similar to split-spool technologies, and/or the like.

In aspects, the system and process of the disclosure may implement the secondary braking mechanism with test circuitry that may be implemented within the aircraft to confirm electrical wiring to a one-time actuation device is "correct" without directly activating the device. In further aspects, the test circuitry may be internally integrated within the aircraft to simulate and further "test" the circuit continuities.

In aspects, the system and process of the disclosure may implement the secondary braking mechanism as a secondary load path, manually activated, intended for emergent usage with rescue hoist operation, and/or the like. In aspects, the system and process of the disclosure may implement the secondary braking mechanism such that as a braking mechanism that may act as a ratchet and pawl braking system, allowing slow-down and braking in one direction, while still allowing emergent lifting in the other direction. Such action may be obtained by varying skew, ramp angles, and/or the like on the brake disc assembly.

FIG. 1 illustrates a helicopter with an exemplary helicopter hoist system in accordance with aspects of the disclosure.

In particular, FIG. 1 shows a helicopter 100 with a hoist system 101, which may be used for search and rescue missions, transport missions, combat insertion missions, combat extraction missions, and/or the like. In certain aspects, the hoist system 101 may be implemented as a Helicopter Flight Rescue System (HFRS), a Helicopter External Transport System (NETS), and/or the like. As shown in FIG. 1, the hoist system 101 may be positioned on an upper side of the aircraft and may be attached directly or indirectly to the helicopter 100. In other aspects, the hoist system 101 may be mounted to a bottom of the helicopter 100, may be mounted to a side of the helicopter 100, may be mounted internally to the helicopter 100, and/or the like.

Although FIG. 1 depicts a helicopter as the exemplary airborne platform, the hoist system 101 and its associated principles and/or methodologies described herein, are not limited to helicopters, and may be applied to any airborne platform. For example, the hoist system 101 may be attached directly or indirectly to a cargo helicopter (not shown), such as mounted underneath an aircraft fuselage, mounted to a tilt rotor aircraft, an aerial crane, a flying crane, and/or the like. The hoist system 101 may also be coupled to an autonomous or remote-controlled aircraft, such as an unmanned aerial vehicle (UAV), unmanned aircraft system (UAS), a drone, a fixed wing aircraft, and/or the like. Of course, the hoist system 101 may also be implemented in static configurations, non-aircraft based configurations, and/or the like.

Referring to FIG. 1, the hoist system 101 may include a hook 102 and a cable 104. The hook 102 may be positioned between the cable 104 and a hook portion 106. That is, the hook 102 may be connected to the cable 104 at its upper end, and may be connected to the hook portion 106 (or another object) on its lower end. As appreciated by one skilled in the art with the benefit of this disclosure, the hook 102 may be connected directly or indirectly to the cable 104 and the hook portion 106. For instance, as shown in FIG. 1, a spring-interface device 108 may be connected between the cable 104 and the hook 102. In other aspects, the cable 104 may be connected directly to the hook portion 106. In other aspects, the cable 104 may be connected to the hook portion 106 through the spring-interface device 108. In other aspects, the cable 104 may be connected to the hook portion 106 through other intervening structure including mechanical fasteners.

Figure 2:
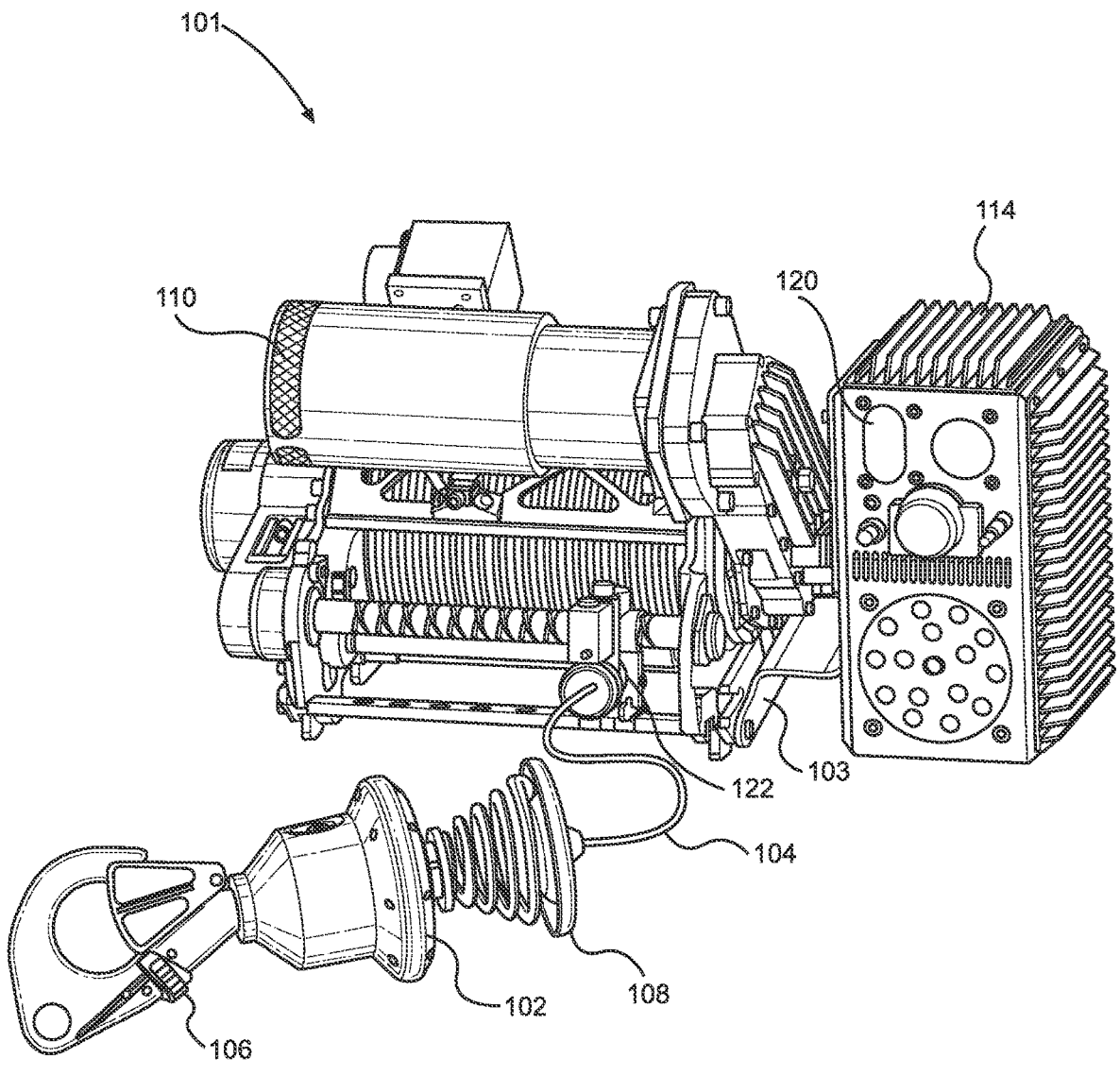
FIG. 2 illustrates an enlarged view of components of the helicopter hoist system shown in FIG. 1.

FIG. 2 illustrates an enlarged view of components of the helicopter hoist system shown in FIG. 1.

In particular, FIG. 2 illustrates an enlarged view of the hoist system 101 shown in FIG. 1, with the cable 104 in a generally retracted position. The hoist system 101 may include a frame 103 on which the hoist equipment may be directly or indirectly mounted including the cable 104, the hook 102, the hook portion 106, a motor 110, and/or the like. The hoist system 101 may include an electronic system 114 that may be configured to function as a controller and may include a housing. The electronic system 114 may include communication systems, communication equipment, electronics and processing equipment, and/or the like.

Additionally, the hoist system 101 may include an emergency brake system 400 (shown in FIG. 3), which may also be referred to as a secondary brake system. The emergency brake system 400 may be implemented at least partially in the hoist system 101, or any associated components of the hoist system 101 including the frame 103, the electronic system 114, the helicopter 100, and/or the like.

The motor 110 may be a brushless motor, which may provide smoother raising and lowering of the cable 104. In another aspect, the motor 110 may include a high-performance variable-speed brushless permanent magnet rotary servomotor, with Universal AC or DC power input. In some aspects, the torque output may range between 5.6 Nm and 13.9 Nm. As appreciated by those skilled in the art, the torque range may vary and may be less than or more than 5.6 Nm and 13.9 Nm. In addition, any suitable motor or motors may be implemented as part of the hoist equipment. Additionally, the hoist system 101 may include reduction gearing 144, a cable storage drum 142, and/or the like as shown in FIG. 3.

The electronic system 114 also may include a host of other electronic equipment, which are not shown in FIG. 2, but are described in more detail below including communication systems, antenna, processing/control systems including image-processing systems, power-management systems, control systems, motor control systems, sensor systems, and/or the like.

Figure 3:
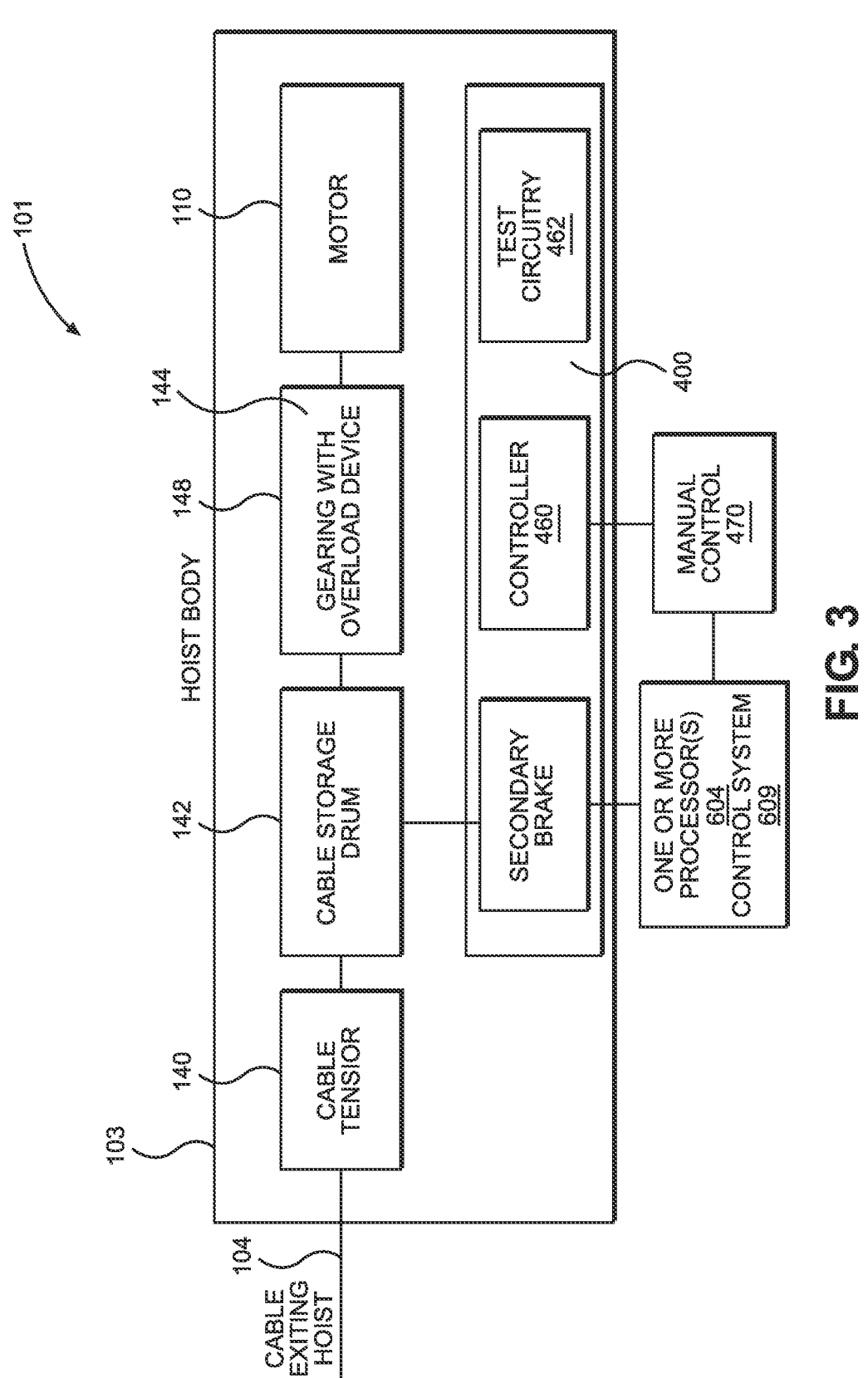
FIG. 3 illustrates a schematic of components of the helicopter hoist system shown in FIG. 1.

FIG. 3 illustrates a schematic of components of the helicopter hoist system shown in FIG. 1.

In particular, FIG. 3 illustrates further details of the hoist system 101 and the emergency brake system 400. In this regard, the emergency brake system 400 may be integrated into the hoist system 101, the emergency brake system 400 may be implemented separate from the hoist system 101, the emergency brake system 400 may be an aftermarket component that may be configured to be implemented and/or installed with the hoist system 101, and/or the like. The hoist system 101 may include the cable 104, a cable tensioner 140, the cable storage drum 142, an Overload Protection Device (OLPD) 148, the reduction gearing 144, the motor 110, and/or the like.

The hoist system 101 may further include the emergency brake system 400. The emergency brake system 400 may be implemented in response to a manual control 470, the emergency brake system 400 may be implemented automatically, the emergency brake system 400 may be implemented automatically in response to a controller such as the electronic system 114, a controller 460, one or more processor(s) 604, a control system 609, and/or the like. In one aspect, the manual control 470 may be implemented via one or more human activated switches within the helicopter 100. For example, one or more switches may be activated by the pilot, the crew, and/or the like. In this regard, in one or more aspects, activation of the emergency brake system 400 may be implemented manually. In this aspect, the emergency brake system 400 may be implemented without the need for and/or without implementation of the electronic system 114, the controller 460, the one or more processor(s) 604, the control system 609, and/or the like. In one aspect, the manual control 470 may be implemented with dual action redundancy, triple action redundancy, and/or the like. In this regard, the manual control 470 implementing dual action redundancy, triple action redundancy, and/or the like may reduce the likelihood of inadvertent actuation, which increases safety. Additionally, the emergency brake system 400 may include further redundancies such as not enabling arming circuitry unless a hoist load detected, aircraft flight is detected (weight on wheels switch signals "OFF"), and/or the like.

The arrangement of the motor 110, the reduction gearing 144, the Overload Protection Device (OLPD) 148, the cable storage drum 142, the cable tensioner 140, the cable 104, the emergency brake system 400, and/or the like of the hoist system 101 may be as illustrated in FIG. 3. However, the arrangement may be different, may include additional components, may include additional intervening components, may include fewer components, may include combined components, and/or the like.

In one aspect, the motor 110 may deliver a torque directly to the reduction gearing 144 or the motor 110 may deliver a torque to the reduction gearing 144 through an intermediate gear train or other component of the hoist system 101. In one aspect, the reduction gearing 144 may deliver a torque directly to the Overload Protection Device (OLPD) 148 or the reduction gearing 144 may deliver a torque to the Overload Protection Device (OLPD) 148 through an intermediate gear train or other component of the hoist system 101. In one aspect, the Overload Protection Device (OLPD) 148 may deliver a torque directly to the cable storage drum 142 or the Overload Protection Device (OLPD) 148 may deliver a torque to the cable storage drum 142 through an intermediate gear train or other component of the hoist system 101. In one aspect, the cable storage drum 142 may reel or unreel the cable 104 or the cable storage drum 142 may reel or unreel the cable 104 in conjunction with the cable tensioner 140. In particular, the cable tensioner 140 may be and/or may include tensioning mechanisms that may provide proper cable management and tightness of the cable 104 on the cable storage drum 142, and/or otherwise manage a routing of the cable 104 towards driving components of the hoist system 101.

As further illustrated in FIG. 3, the emergency brake system 400 may include a controller such as the controller 460, and/or the like. The emergency brake system 400 may include the controller 460 and/or may connect to one or more processor(s) 604 and/or may connect to a control system 609 as further described herein. The manual control 470 may connect to any one or more of a controller such as the electronic system 114, the controller 460, the one or more processor(s) 604, the control system 609, and/or the like.

The Overload Protection Device (OLPD) 148 may be configured to limit the loads that can be imparted on the hoist system 101 including the cable 104, the cable tensioner 140, the cable storage drum 142, the reduction gearing 144, the motor 110, and/or the like, therefore protecting the hoist system 101, the underslung load, and/or the like.

The Overload Protection Device (OLPD) 148 may be implemented with one or more mechanical clutches. In this regard, the one or more mechanical clutches may be configured and designed to slip (OLPD activation) at a certain torsional range and allow the cable 104 to reel out from the cable storage drum 142 during overload events. More specifically, the Overload Protection Device (OLPD) 148 may be configured and designed to receive a torque from the motor 110, the reduction gearing 144, and/or other components of the hoist system 101 and at a certain torsional range, the Overload Protection Device (OLPD) 148 may prevent that torque from being delivered to other components of the hoist system 101 including the cable storage drum 142, the cable tensioner 140, the cable 104, other components of the hoist system 101, and/or the like (OLPD activation). In particular, the Overload Protection Device (OLPD) 148 may allow the cable 104 to reel out (OLPD activation) from the cable storage drum 142 during overload events irrespective of operation of the motor 110.

Moreover, the helicopter hoist system 101 may implement reengagement of the Overload Protection Device (OLPD) 148 after OLPD activation. In this regard, the one or more mechanical clutches may be configured and designed to stop slipping below the certain torsional range and allow the cable 104 to reel in and/or out from the cable storage drum 142 consistent with operation of the motor 110. In various aspects, the one or more mechanical clutches may be coupled to internal rotating components, and may be placed either adjacent to the cable storage drum 142, within the reduction gearing 144, an equivalent assembly, other components of the hoist system 101 and/or the like.

In various aspects, the hoist system 101 may implement the Overload Protection Device (OLPD) 148 utilizing electrically activated clutches, using load detection devices or means, such as a load cell 306, that may be connected with electronics, processors, a controller such as the electronic system 114, the controller 460, the one or more processor(s) 604, the control system 609 and/or the like such that the reduction gearing 144 and/or the motor 110 may become temporarily decoupled from the cable storage drum 142, the cable tensioner 140, the cable 104, and/or the like during an overload event (OLPD activation). In this regard, the Overload Protection Device (OLPD) 148 utilizing the electrically activated clutches, the load detection devices or means, and/or the like may operate to some degree in an analogous manner as the Overload Protection Device (OLPD) 148 implementing the one or more mechanical clutches noted above.

The cable storage drum 142 may be coupled mechanically to the reduction gearing 144 and powered by the motor 110. The motor 110 may be implemented as an electrical system as described above. Alternatively or additionally, the motor 110 may be implemented at least in part as a hydraulic system. Additionally, the hoist system 101 may include a number of other rotating components implemented internally to the hoist system 101 and/or externally to the hoist system 101.

Figure 14:
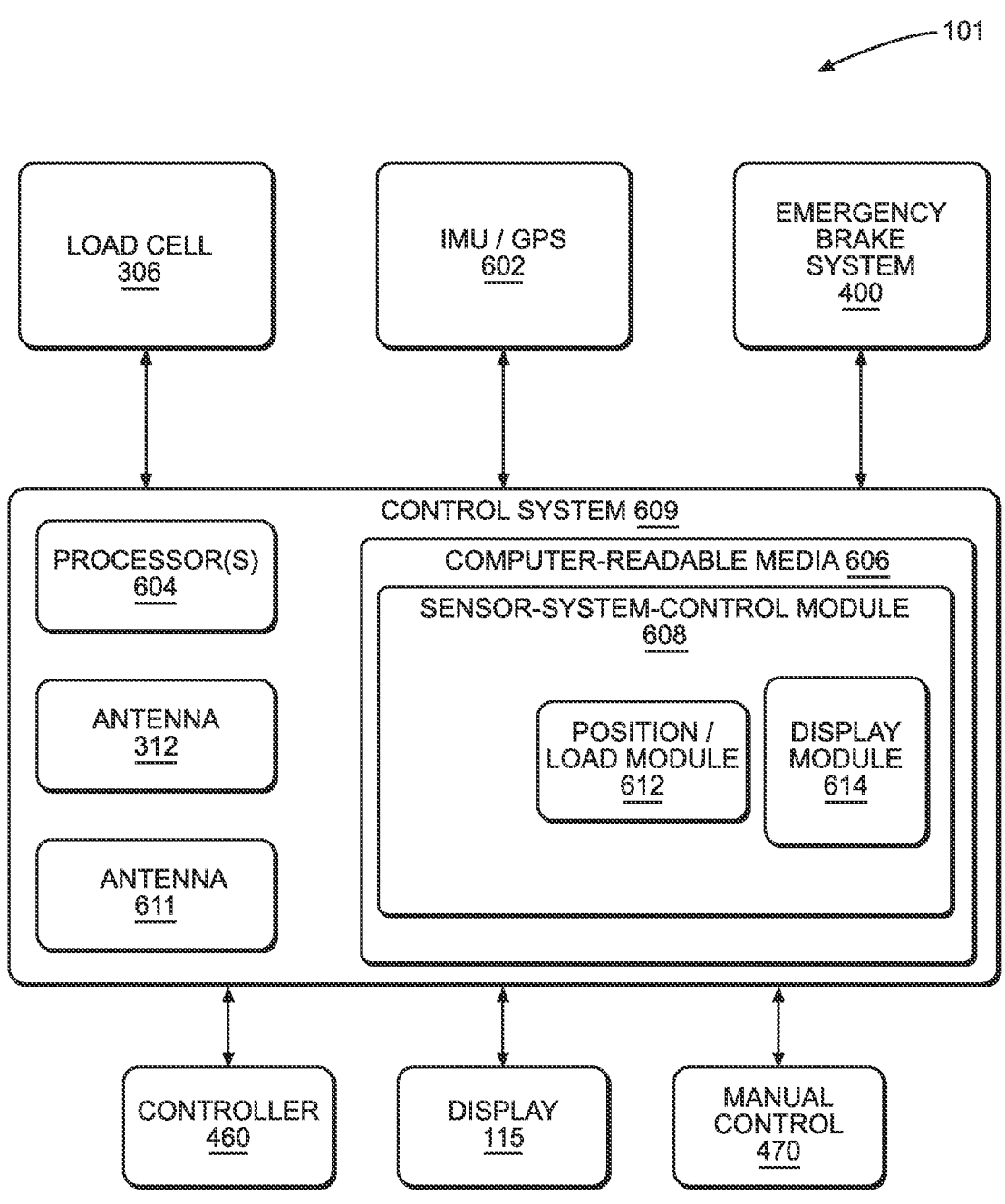
FIG. 14 illustrates a block diagram illustrating select components of an example helicopter hoist system in accordance with aspects of the disclosure.

The hoist system 101 may include devices or means for detecting activation of the Overload Protection Device (OLPD) 148, a clutch activation, a component slip of the hoist system 101, and/or the like regardless of means or components of the hoist system 101. The hoist system 101 may include a sensor configured as an OLPD activation sensor. In particular, the hoist system 101 may detect OLPD activation with the sensor configured as an OLPD activation sensor and may signal the pilot and/or the crew on a display 115, which is illustrated in FIG. 14. Thereafter, the pilot and/or the crew may implement the emergency brake system 400 by operating the manual control 470.

Figure 4:
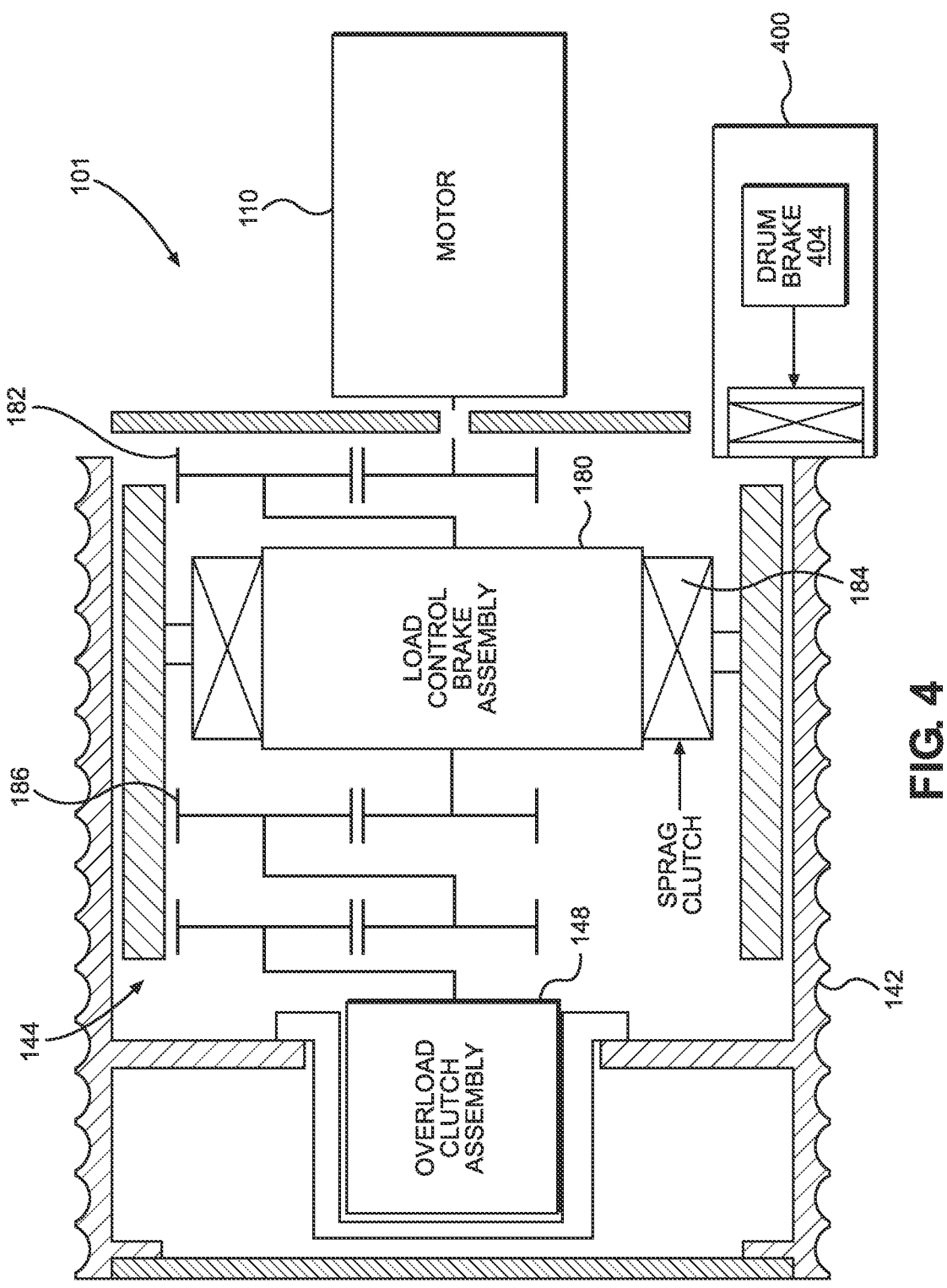
FIG. 4 illustrates an exemplary cross-sectional view of components of the helicopter hoist system shown in FIG. 3.

FIG. 4 illustrates an exemplary cross-sectional view of components of the helicopter hoist system shown in FIG. 3.

In particular, FIG. 4 illustrates the hoist system 101 implementing the motor 110, the emergency brake system 400, the cable storage drum 142, the Overload Protection Device (OLPD) 148, and/or the like. Additionally, the hoist system 101 may include a load control brake assembly 180.

In one aspect, the emergency brake system 400 may be connected to the cable storage drum 142 to provide emergency braking as described in further detail herein. However, the emergency brake system 400 may be connected through any of the various components between the motor 110 and the cable storage drum 142. Moreover, the emergency brake system 400 is distinguished from the load control brake assembly 180.

With further reference to FIG. 4, the motor 110 may provide torque through various components to rotate the cable storage drum 142. In one aspect, the motor 110 may provide torque through one or more of the load control brake assembly 180, the reduction gearing 144, the Overload Protection Device (OLPD) 148, and/or the like to rotate the cable storage drum 142. In one aspect, the motor 110 may provide torque through first transmission portion 182 of the reduction gearing 144 to the load control brake assembly 180. Thereafter, the torque from the motor 110 may drive a second transmission portion 186 of the reduction gearing 144. The second transmission portion 186 may thereafter deliver the torque from the motor 110 to the cable storage drum 142 through the Overload Protection Device (OLPD) 148.

The reduction gearing 144, which may or may not include the first transmission portion 182 and the second transmission portion 186 may be implemented as a transmission, one or more gears, and/or the like. The load control brake assembly 180 may be manually controlled, automatically controlled, and/or the like. The load control brake assembly 180 may include a sprag clutch 184. The sprag clutch 184 may be implemented as a one-way freewheel clutch. In some aspects, the sprag clutch 184 may be configured to prevent the hoist system 101 from catastrophically dropping the load in the event of a mechanical failure.

Figure 5:
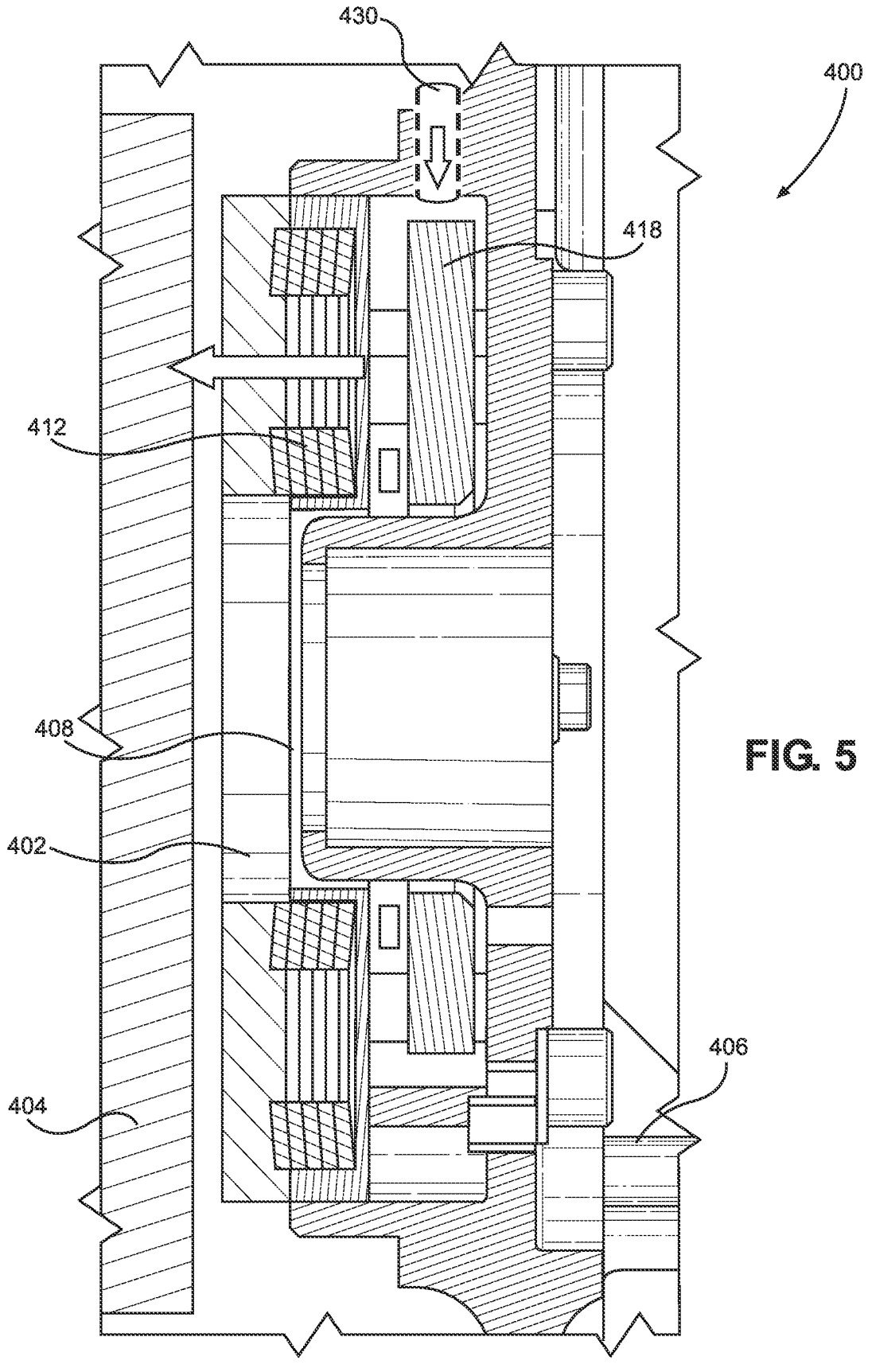
FIG. 5 illustrates a cross-sectional view of an exemplary brake system in accordance with aspects of the disclosure.

FIG. 5 illustrates a cross-sectional view of an exemplary brake system in accordance with aspects of the disclosure.

Figure 6:
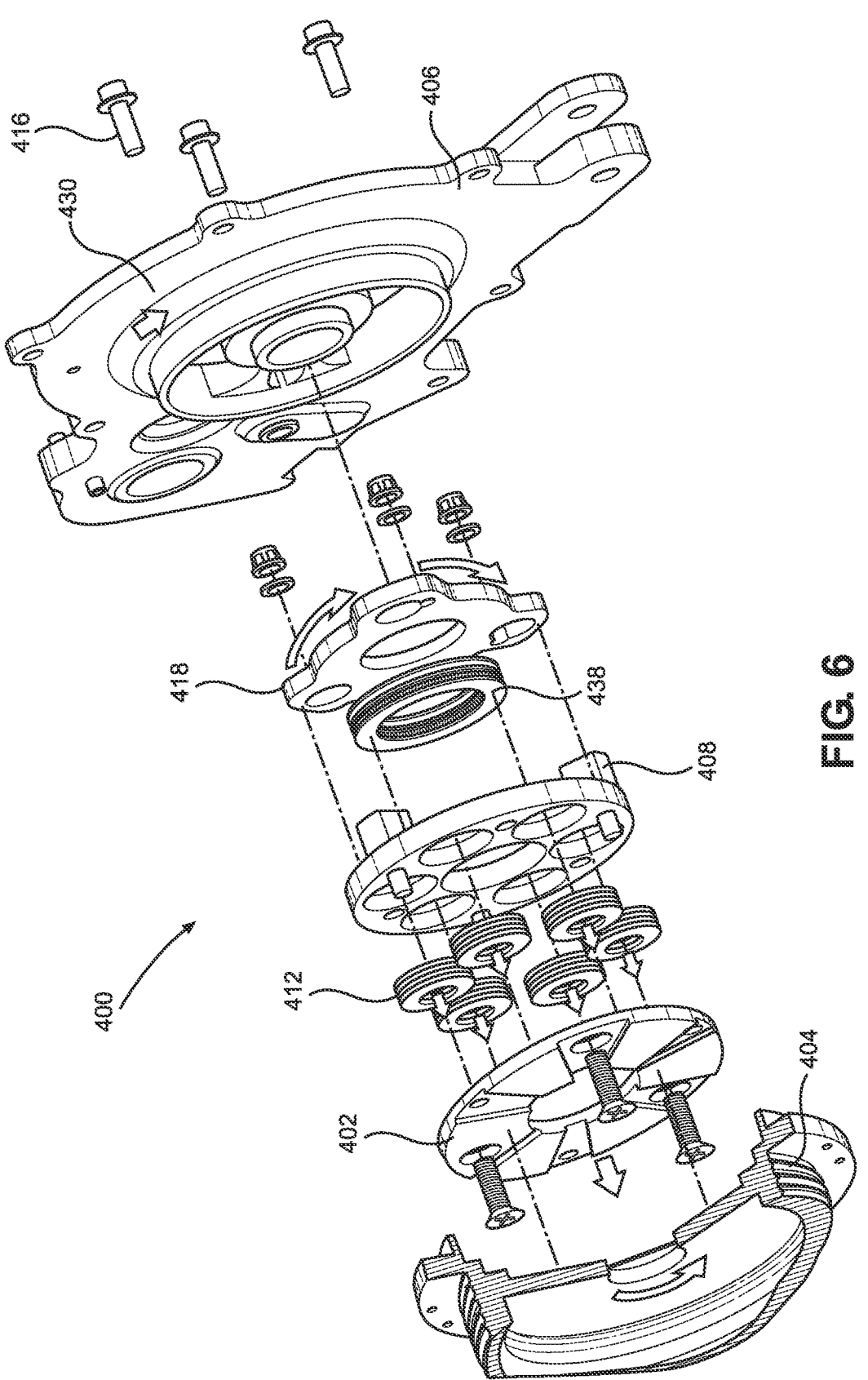
FIG. 6 illustrates an exploded view of the exemplary brake system in accordance with FIG. 5.

FIG. 6 illustrates an exploded view of the exemplary brake system in accordance with FIG. 5.

Figure 7:
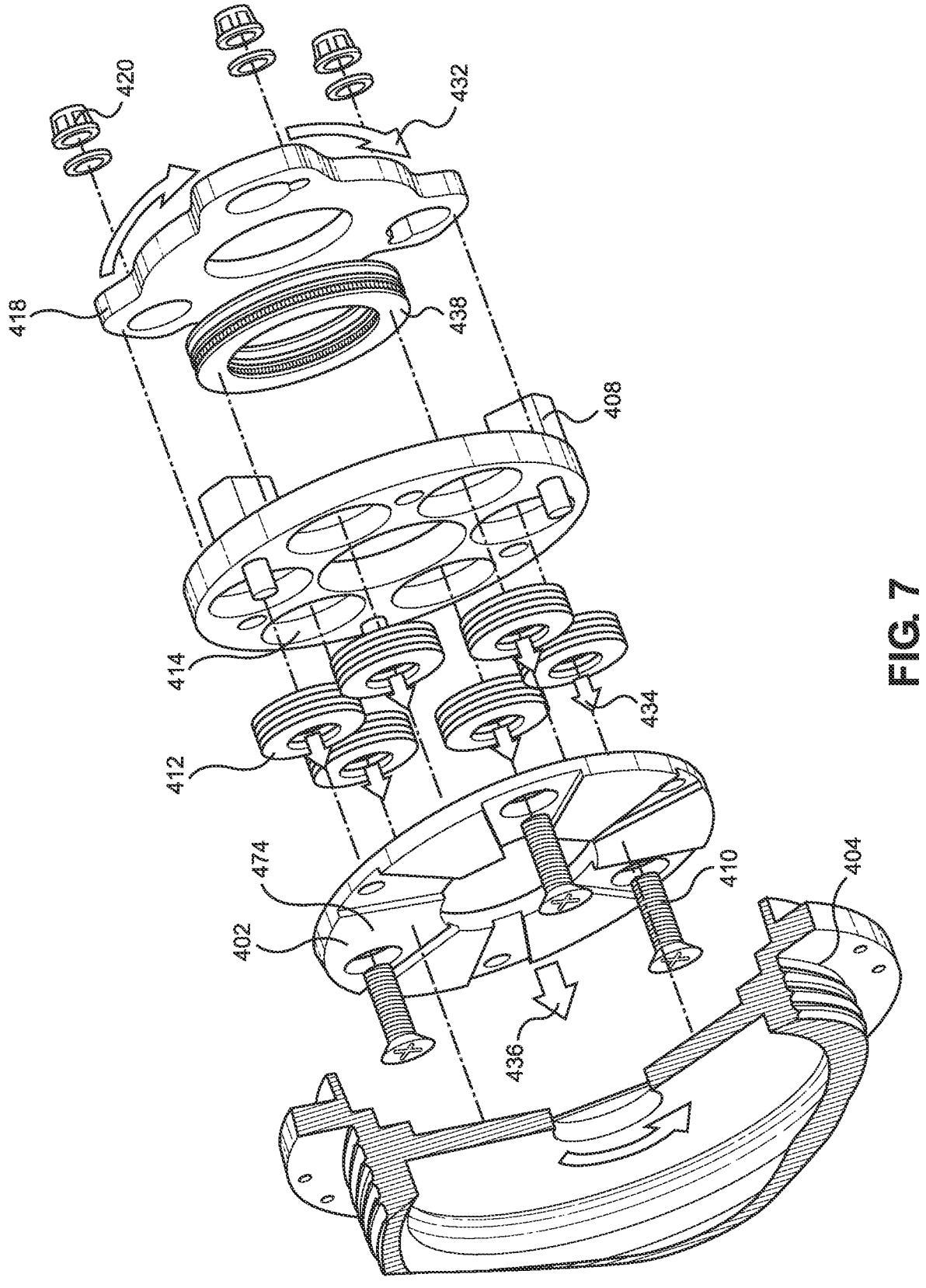
FIG. 7 illustrates a further detailed view of the exploded view of the exemplary brake system in accordance with FIG. 6.

FIG. 7 illustrates a further detailed view of the exploded view of the exemplary brake system in accordance with FIG. 6.

In particular, FIG. 5 illustrates an exemplary implementation of the emergency brake system 400 together with various exemplary components for implementation of the emergency brake system 400. In one or more aspects, the emergency brake system 400 may include brake components that may include a brake disk 402 and a brake drum 404. The emergency brake system 400 may be implemented utilizing a number of different brake technologies and/or brake components. Accordingly, although particular exemplary brake technologies and/or brake components are described herein, numerous other brake technologies and/or brake components are contemplated and may be applicable. For example, brake technology utilizing brake components that may include one or more of brake shoes, brake pads, brake discs, brake calipers, mechanically actuated brakes, hydraulically actuated brakes pneumatically actuated brakes electromagnetically actuated brakes, and/or the like.

In operation, the motor 110 may provide rotational torque in the hoist system 101 and rotate the cable storage drum 142. In one aspect, the brake drum 404 may be attached directly or indirectly to the cable storage drum 142. During normal lifting operations, non-emergency operations, and/or the like the brake drum 404 and the brake disk 402 may be separated from the brake drum 404 as shown by a gap therebetween in FIG. 5 allowing the rotational torque provided by the motor 110 to be transmitted through the reduction gearing 144 and/or the like to rotate the cable storage drum 142. When the emergency brake system 400 is actuated, the brake disk 402 may engage the brake drum 404 to prevent rotation of the brake drum 404 and prevent rotation of the cable storage drum 142. In other words, the gap between the brake disk 402 and the brake drum 404 is closed and the brake drum 404 prevents rotation of the cable storage drum 142. However, it should be recognized that the emergency brake system 400 may be implemented utilizing any component of the hoist system 101.

In particular aspects and with reference to FIG. 6, the brake disk 402 may be mounted to a flange 406. In this regard, the flange 406 and the brake disk 402 may be configured to not rotate whereas the brake drum 404 may be configured to rotate with the cable storage drum 142 in response to the motor 110, the reduction gearing 144, the Overload Protection Device (OLPD) 148, and/or the like. However, it should be appreciated that the emergency brake system 400 may be implemented utilizing a number of different brake technologies and/or brake components. Moreover, the different brake technologies and/or brake components of the emergency brake system 400 may be arranged and/or located with any of the various disclosed components including the frame 103, the cable tensioner 140, the cable storage drum 142, the Overload Protection Device (OLPD) 148, the reduction gearing 144, the motor 110, and/or the like.

Additionally, the emergency brake system 400 may include potential energy devices 412. The potential energy devices 412 may be configured to release their potential energy in order energize operation of the brake disk 402 to engage the brake drum 404. More specifically, the potential energy devices 412 may be configured to release their potential energy in order to move the brake disk 402 to engage the brake drum 404 such that there is no gap between the brake disk 402 and the brake drum 404. The potential energy devices 412 may be implemented with springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, solenoid devices, torsional preloaded devices, torsional springs, and/or the like. As shown in FIG. 5, FIG. 6, and FIG. 7, the potential energy devices 412 are illustrated as being implemented by springs that may be preloaded compression springs. In this regard, the potential energy devices 412 implemented as preloaded compression springs may release their potential energy in order energize operation of the brake disk 402 to engage the brake drum 404. In other words, when implemented the preloaded compression springs are released and apply a force to the brake disk 402 that thereafter applies a force to the brake drum 404 to apply a braking force to the brake drum 404 as well as the cable storage drum 142 to stop movement of the cable storage drum 142, the cable 104, and/or the like of the hoist system 101.

The potential energy devices 412 may be arranged in a bracket 408. In particular aspects, the potential energy devices 412 implemented as preloaded compression springs may be arranged in apertures 414 in the bracket 408 as illustrated in FIG. 7. Additionally, the bracket 408 may be mechanically fastened to the flange 406. In one aspect, the bracket 408 may be mechanically fastened to the flange 406 with mechanical fasteners 416. The mechanical fasteners 416 may extend through the flange 406 and into apertures of the bracket 408 as illustrated in FIG. 6. In one aspect, the apertures of the bracket 408 may be threaded to receive the mechanical fasteners 416.

The brake disk 402 may be connected to the actuation device 418 through the bracket 408. With reference to FIG. 7, the brake disk 402 may be mechanically fastened to the actuation device 418. In particular, one or more fasteners 410 may extend through the brake disk 402 and may be connected to the actuation device 418. In this regard, the one or more fasteners 410 may be threaded and corresponding threaded components 420 may be configured to receive the one or more fasteners 410. In one aspect, the one or more fasteners 410 may be bolts and the corresponding threaded components 420 may be nuts, which may include washers. Additionally, the one or more fasteners 410 may extend through the bracket 408. Additionally, the emergency brake system 400 may include a thrust bearing 438. The thrust bearing 438 may allow the actuation device 418 to rotate as illustrated by an arrow 432.

Additionally, the brake disk 402 may include brake components 474. The brake components 474 may include materials and/or features to induce friction. In one or more aspects, the brake components 474 and/or high friction features may include materials, serrations, ramps, other non-planar structures, and/or the like to increase frictional coupling between the brake disk 402 and the brake drum 404. Alternatively, the brake disk 402 may be implemented with other configurations such as components with flat surfaces.

The actuation device 418 may be configured to actuate the potential energy devices 412. In one aspect, the actuation device 418 may be a spring compression disk in implementations of the potential energy devices 412 that are preloaded compression springs. In particular aspects with reference to FIG. 5, the flange 406 may hold the actuation device 418, the bracket 408, and the brake disk 402 with the potential energy devices 412 implemented as compression springs such that the compression springs are loaded by compression.

Additionally, the flange 406 may include an actuation mechanism 430 as illustrated in FIG. 5 and FIG. 6. The actuation mechanism 430 may be implemented as an electrical actuation mechanism, pyrotechnic actuation mechanism, non-explosive instantaneous actuation mechanism similar to split-spool technologies, and/or the like. The actuation mechanism 430 may be responsive to the manual control 470, any one or more of a controller such as the electronic system 114, the controller 460, the one or more processor(s) 604, the control system 609, and/or the like.

When the actuation mechanism 430 is actuated, it rotates the actuation device 418 as illustrated by the arrows 432 as shown in FIG. 7. Thereafter, the potential energy devices 412 implemented as compression springs may be released and may apply a force in the direction of arrow 434 to the brake disk 402, and the brake disk 402 may apply a force in the direction of arrow 436 to the brake drum 404 to apply a braking energy to the brake drum 404 and likewise to the cable storage drum 142.

In aspects, the potential energy devices 412 may be implemented with pneumatic pressure, pneumatic devices, preloaded pneumatic devices, hydraulic pressure, hydraulic devices, preloaded hydraulic devices, electrical devices, solenoid devices, torsional preloaded devices, torsional springs, and/or the like and the actuation mechanism 430 may likewise release the potential energy of the potential energy devices 412 and may apply a force in the direction of arrow 434 to the brake disk 402, and the brake disk 402 may apply a force in the direction of arrow 436 to the brake drum

404 to apply a braking energy to the brake drum 404 and likewise to the cable storage drum 142.

In aspects, the hoist system 101 may implement the emergency brake system 400 such that after actuation any one or more of the components may be configured to be mechanically replaceable, resettable, and/or the like for a future implementation of the emergency brake system 400. Additionally, the emergency brake system 400 may be implemented to be responsive to the manual control 470, a controller such as the electronic system 114, the controller 460, the one or more processor(s) 604, the control system 609, and/or the like.

In one or more aspects, the emergency brake system 400 may be configured to allow slow-down and braking of the hoist system 101, the cable 104, and/or the like in one direction, while still allowing emergent lifting in the other direction by the hoist system 101, the cable 104, and/or the like. In one or more aspects, the emergency brake system 400 may be configured with a ratchet and pawl braking system, configured to slow-down and braking in one direction by the hoist system 101, the cable 104, and/or the like, while still allowing emergent lifting in the other direction by the hoist system 101, the cable 104, and/or the like. In particular, the emergency brake system 400 may implement varying skew, ramp angles, and/or the like on the brake disk 402, the brake drum 404, and/or the like.

In particular aspects, a controller such as the electronic system 114, the controller 460, the one or more processor(s) 604, the control system 609, and/or the like may be configured with test circuitry 462 that may be implemented within the helicopter 100 to confirm electrical wiring to a one-time actuation device such as the manual control 470 is "correct" without directly activating the device. More specifically, the test circuitry 462 may confirm electrical connections between a controller such as the electronic system 114, the controller 460, the one or more processor(s) 604, the control system 609, and/or the like and various components of the hoist system 101, the emergency brake system 400, the actuation mechanism 430, and/or the like. Additionally, the test circuitry 462 may be integrated into the helicopter 100 between a controller such as the electronic system 114, the controller 460, the one or more processor(s) 604, the control system 609, and/or the like and various components of the hoist system 101, the emergency brake system 400, the actuation mechanism 430, and/or the like. Moreover, the test circuitry 462 may be configured to simulate operation of a controller such as the electronic system 114, the controller 460, the one or more processor(s) 604, the control system 609, and/or the like and various components of the hoist system 101, the emergency brake system 400, the actuation mechanism 430, and/or the like. Further, the test circuitry 462 may be configured to test continuities, connections, and/or the like between a controller such as the electronic system 114, the controller 460, the one or more processor(s) 604, the control system 609, and/or the like and various components of the hoist system 101, the emergency brake system 400, the actuation mechanism 430, and/or the like.

Figure 8:
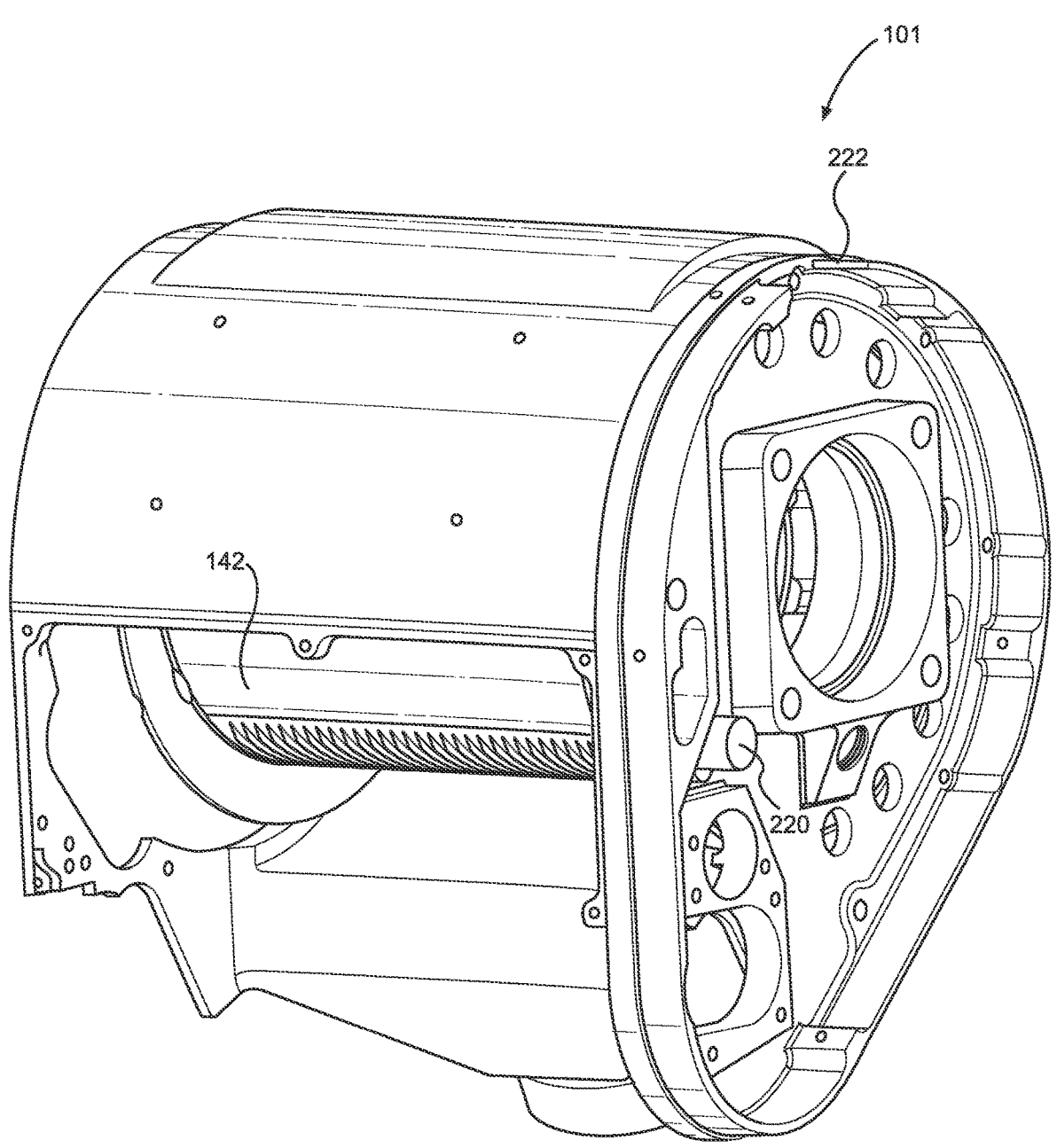
FIG. 8 illustrates an enlarged perspective view of components of another aspect of the helicopter hoist system shown in FIG. 1.

FIG. 8 illustrates an enlarged perspective view of components of another aspect of the helicopter hoist system shown in FIG. 1.

Figure 9:
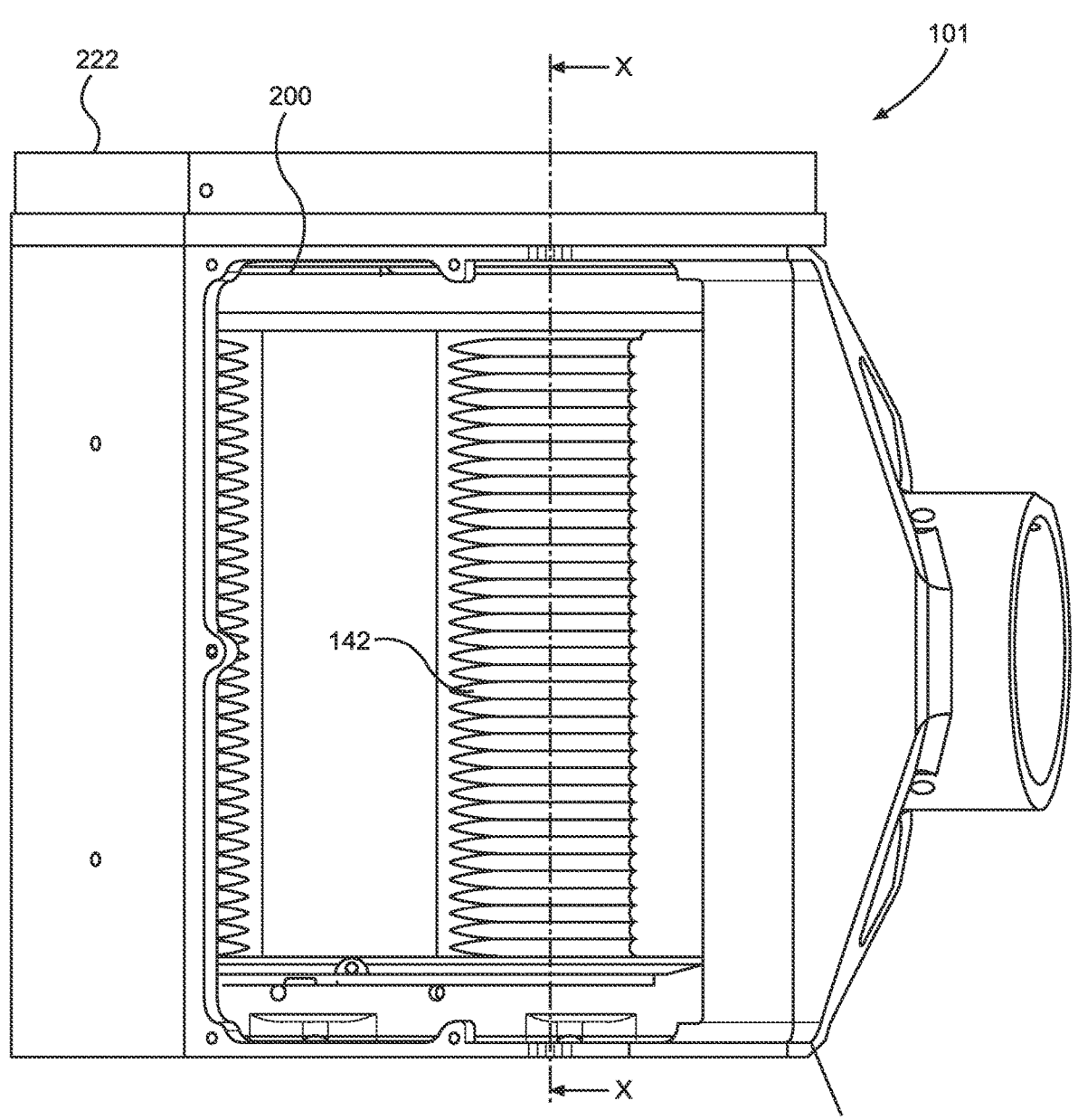
FIG. 9 illustrates an enlarged front view of the helicopter hoist system shown in FIG. 8.

FIG. 9 illustrates an enlarged front view of the helicopter hoist system shown in FIG. 8.

Figure 10:
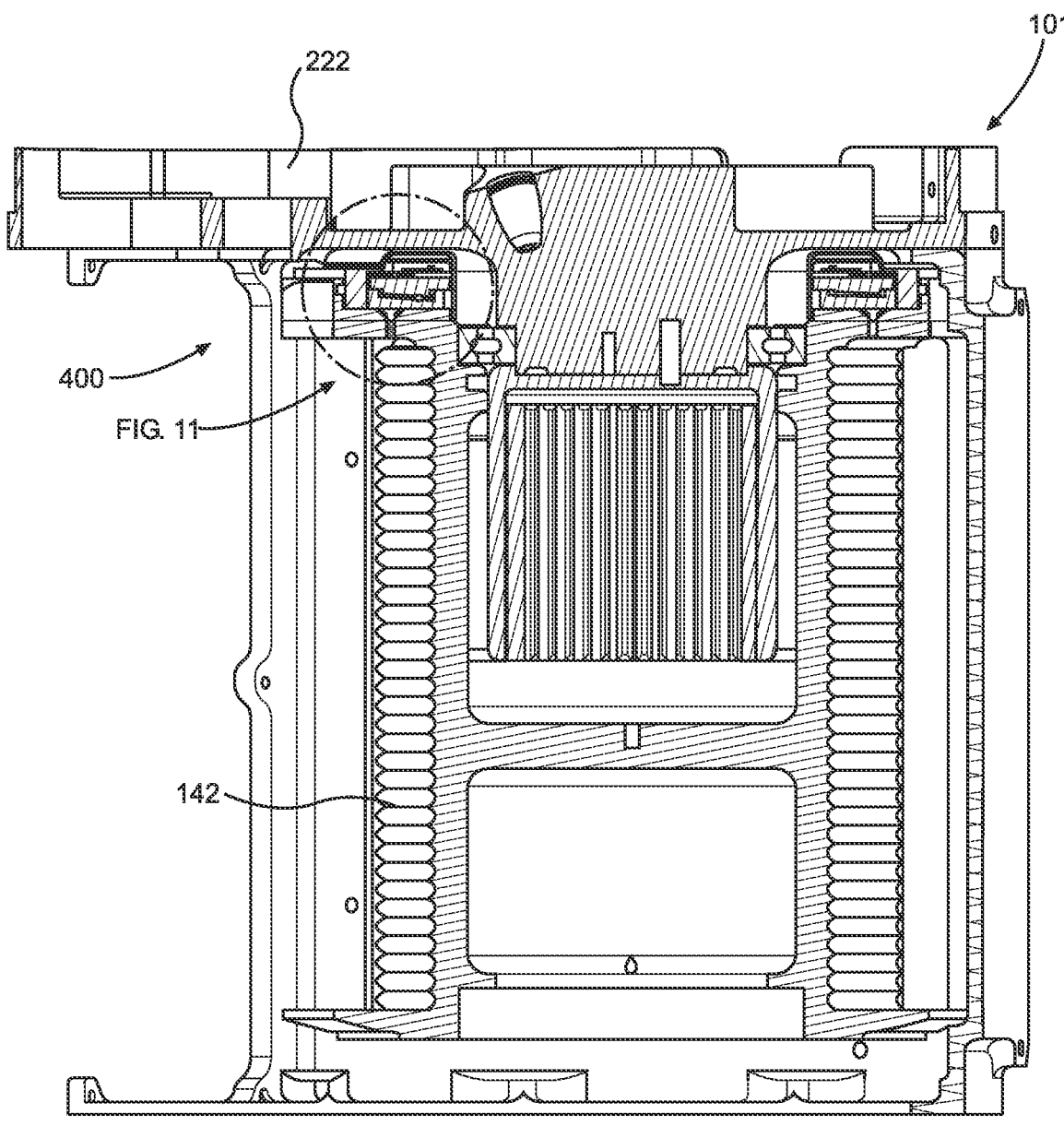
FIG. 10 illustrates cross-sectional view of the helicopter hoist system shown in FIG. 9 along lines X-X.

FIG. 10 illustrates cross-sectional view of the helicopter hoist system shown in FIG. 9 along lines X-X.

Figure 11:
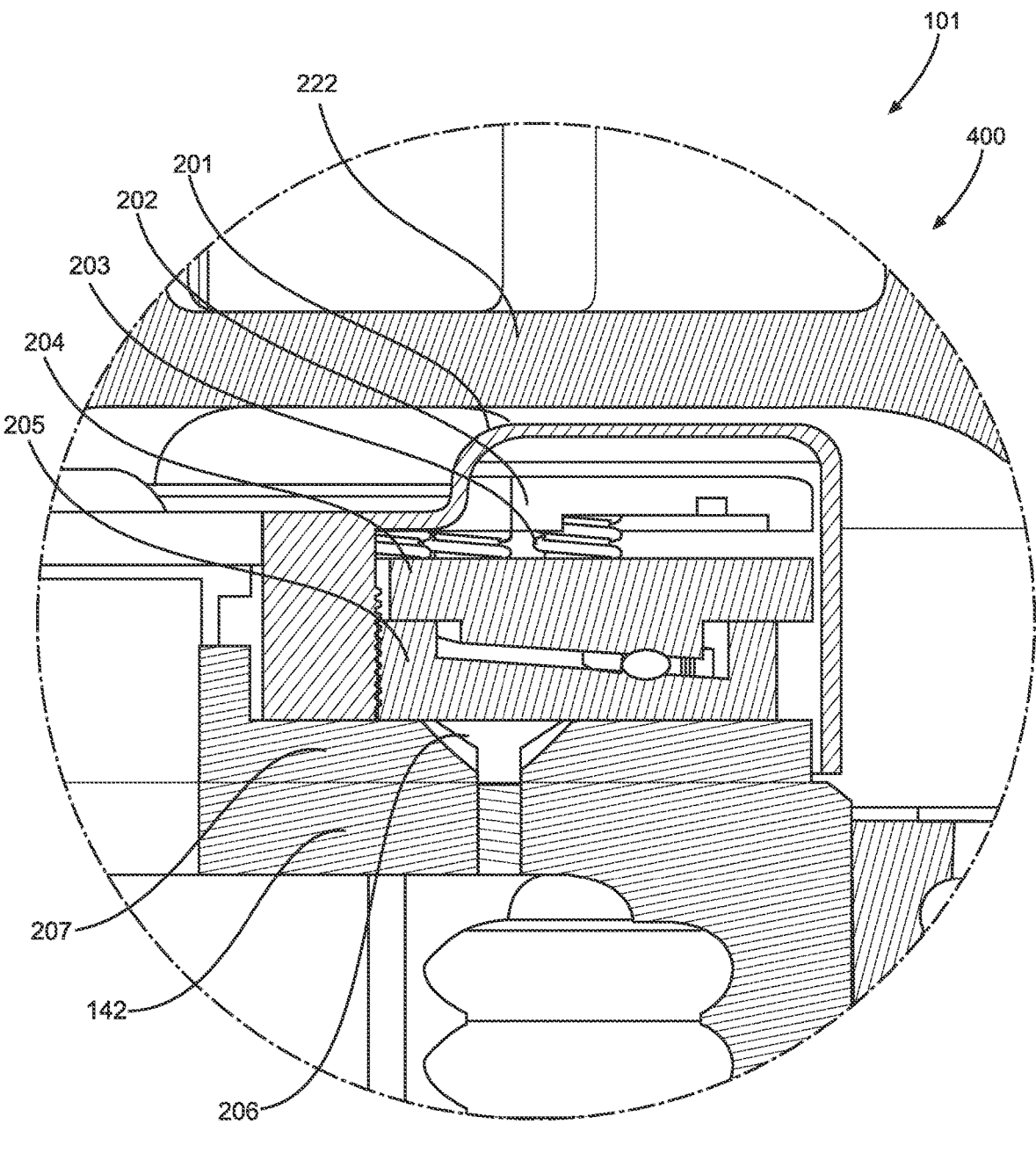
FIG. 11 illustrates detail XI of the cross-sectional view of the helicopter hoist system shown in FIG. 10.

FIG. 11 illustrates detail XI of the cross-sectional view of the helicopter hoist system shown in FIG. 10.

In particular, FIG. 8, FIG. 9, FIG. 10, and FIG. 11 illustrate another aspect of the hoist system 101. In this regard, the aspect associated with FIG. 8, FIG. 9, FIG. 10, and FIG. 11 may include any one or more of the components, features, functions, and/or the like of the hoist system 101 as described herein in relation to any of the other Figures and any description thereof.

In particular, FIG. 8, FIG. 9, and FIG. 10 illustrate that the hoist system 101 may include the cable storage drum 142 and the cable storage drum 142 may include a side flange 222, a release actuator 220, and an emergency brake assembly 200. The emergency brake assembly 200 may be implemented as part of the emergency brake system 400 and/or the emergency brake system 400 may be implemented as part of the emergency brake assembly 200. Additionally, the side flange 222 may be configured to support at least in part the emergency brake system 400, the emergency brake assembly 200, the cable storage drum 142, and/or the like.

The release actuator 220 may be implemented as an electrical actuation mechanism, a pyrotechnic actuation mechanism, a non-explosive instantaneous actuation mechanism similar to split-spool technologies, and/or the like. The release actuator 220 may be responsive to the manual control 470, any one or more of a controller such as the electronic system 114, the controller 460, the one or more processor(s) 604, the control system 609, and/or the like.

With reference to FIG. 11, the hoist system 101 and in particular the emergency brake assembly 200 may include a brake outer retainer 201, a brake pad assembly 202, a brake pad spring disk 203, an outer jaw assembly 204, an inner jaw assembly 205, inner retainer screws and pins 206, an inner retainer 207, and/or the like. In particular aspects, the emergency brake assembly 200, the brake outer retainer 201, the brake pad assembly 202, the brake pad spring disk 203, the outer jaw assembly 204, the inner jaw assembly 205, the inner retainer screws and pins 206, and/or the inner retainer 207 may be axially concentrically arranged on the cable storage drum 142.

The emergency brake assembly 200 may be attached to the cable storage drum 142. In certain aspects, the emergency brake assembly 200 may be configured and implemented to be a normally inactivated passive device. The emergency brake assembly 200 may be responsive to an electrical signal. In particular, the electrical signal may activate the release actuator 220 of the emergency brake assembly 200. In this regard, activation of the release actuator 220 may release a pin. The pin may move to engage the brake outer retainer 201. In particular, engagement by the pin with the brake outer retainer 201 may prevent rotation and drawing into the X Direction. In one aspect, the pin may be a spring-loaded pin, a pin implemented with pneumatic pressure, pneumatic devices, preloaded pneumatic devices, hydraulic pressure, hydraulic devices, preloaded hydraulic devices, electrical devices, solenoid devices, torsional preloaded devices, torsional springs, and/or the like.

Additionally, continued rotation of the cable storage drum 142 may continue to turn the inner retainer 207. For example, continued rotation of the cable storage drum 142 may continue to turn the inner retainer 207 through mechanical contact with the inner retainer screws and pins 206.

The inner jaw assembly 205 may be configured to float on the inner retainer screws and pins 206. Moreover, the inner jaw assembly 205 may be configured to rotate with the cable storage drum 142 and the inner retainer 207. In particular aspects, the inner jaw assembly 205 may move in the X Direction due to a mechanical coupling to the inner jaw assembly 205. The mechanical coupling may be Acme threads arranged on the inner jaw assembly 205. Alternatively, the mechanical coupling may be helical threads, ball screws, and/or the like configured with the inner jaw assembly 205.

Additionally, the outer jaw assembly 204 may be configured to rotate with the inner jaw assembly 205. In one aspect, the outer jaw assembly 204 may be configured to rotate with the inner jaw assembly 205 due to a friction coupling at helical ramps. Further, the emergency brake assembly 200 may be configured such that continued rotation of the cable storage drum 142 may provide a collective motion toward the X Direction. In particular, the emergency brake assembly 200 may be configured such that continued rotation of the cable storage drum 142 may provide a collective motion toward the X Direction that may cause compression of the brake pad assembly 202 via the brake pad spring disk 203.

Further, the emergency brake assembly 200 may be configured for continued rotation of the cable storage drum 142, which may result in progressive braking of the cable storage drum 142 and eventual mechanical clamping of the cable storage drum 142 once compression on the brake pad spring disk 203 results in full spring compression.

However, it should be appreciated that the emergency brake assembly 200 may be implemented utilizing a number of different brake technologies and/or brake components. Moreover, the different brake technologies and/or brake components of the emergency brake assembly 200 may be arranged and/or located with any of the various disclosed components including the frame 103, the cable tensioner 140, the cable storage drum 142, the Overload Protection Device (OLPD) 148, the reduction gearing 144, the motor 110, and/or the like.

The brake components of the emergency brake assembly 200 may include materials and/or features to induce friction. In one or more aspects, the brake components and/or high friction features may include materials, serrations, ramps, other non-planar structures, and/or the like to increase frictional coupling between the components of the emergency brake assembly 200. Alternatively, the components of the emergency brake assembly 200 may be implemented with other configurations such as components with flat surfaces.

Figure 12:
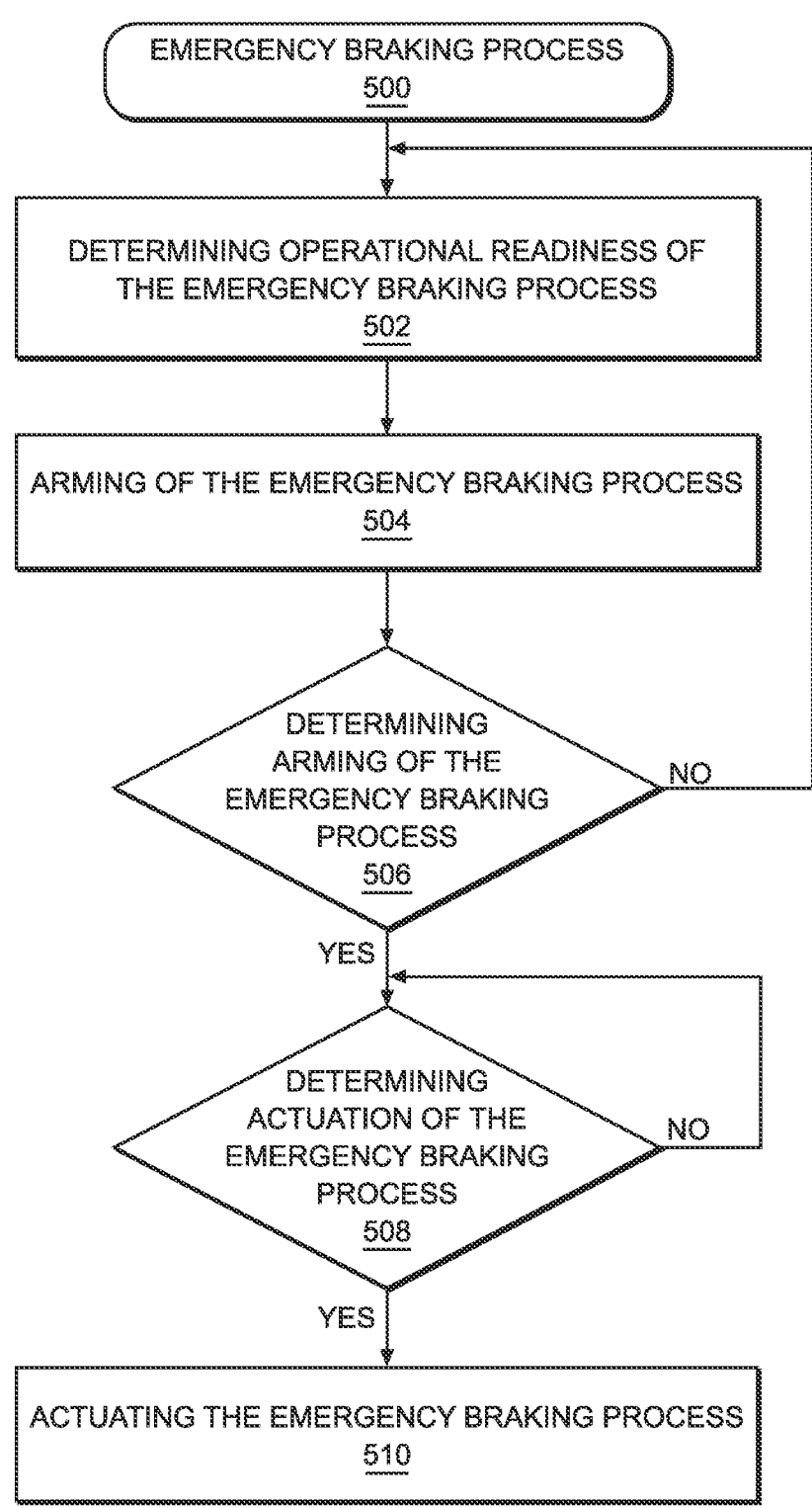
FIG. 12 illustrates an emergency brake process in accordance with aspects of the disclosure.

FIG. 12 illustrates an emergency brake process in accordance with aspects of the disclosure.

In particular, FIG. 12 illustrates an emergency braking process 500. In particular, the emergency braking process 500 may be implemented as described herein with respect to any one of the figures and associated description. More specifically, the emergency braking process 500 may be implemented by the helicopter 100, an electrical system of the helicopter 100, the hoist system 101, an electrical system of the hoist system 101, the electronic system 114, the controller 460, the one or more processor(s) 604, the control system 609, and/or the like. Additionally, the emergency braking process 500 may include one or more of the steps described below and illustrated in FIG. 12. However, the emergency braking process 500 may include additional steps, fewer steps, combined steps, and/or the like. Additionally, the emergency braking process 500 may include a different order of steps.

The emergency braking process 500 may include determining operational readiness of the emergency braking process 502. In particular, the determining operational readiness of the emergency braking process 502 may include operation of the test circuitry 462 as described herein. In the event that the test circuitry 462 indicates that the emergency brake system 400 is not operationally ready, the determining operational readiness of the emergency braking process 502 may signal the pilot and/or the crew on the display 115, which is illustrated in FIG. 14.

The emergency braking process 500 may include arming of the emergency braking process 504. In particular, the arming of the emergency braking process 504 may include arming when a hoist load detected. More specifically, the arming of the emergency braking process 504 may include arming when a hoist load detected in response to a cable-payout and direction detector 122, a distance sensor 320, a load cell 306, a movement sensor 322, a position sensor 308, and/or the like as described in relation to FIG. 13.

Additionally and/or alternatively, the arming of the emergency braking process 502 may include arming if aircraft flight is detected. In particular, the arming of the emergency braking process 502 may include arming if aircraft flight is detected and may be responsive to a weight on wheels switch signal "OFF" indication from the helicopter 100, the hoist system 101, and/or the like.

The emergency braking process 500 may include determining arming of the emergency braking process 506. In particular, determining arming of the emergency braking process 506 may include determining one, more than one, and/or all of the arming of the emergency braking process 502 processes have been armed by the hoist system 101, the emergency brake system 400, and/or the like. If one, more than one, and/or all of the arming of the emergency braking process 502 processes have not been armed by the hoist system 101, the emergency brake system 400, and/or the like, the process returns to box 502. On the other hand, if one, more than one, and/or all of the arming of the emergency braking process 502 processes have armed the hoist system 101, the emergency brake system 400, and/or the like, the process advances to box 508.

The emergency braking process 500 may include determining actuation of the emergency braking process 508. In particular, the determining actuation of the emergency braking process 508 may include determining whether the manual control 470 has been actuated together with any dual action redundancy, triple action redundancy, and/or the like. If the determining actuation of the emergency braking process 508 determines that the manual control 470 has been actuated together with any dual action redundancy, triple action redundancy, and/or the like, then the process advances to box 510. On the other hand, if the determining actuation of the emergency braking process 508 determines that the manual control 470 has not been actuated together with any dual action redundancy, triple action redundancy, and/or the like, then the process returns to box 508.

Likewise, the determining actuation of the emergency braking process 508 may include determining whether the emergency brake system 400 has been implemented automatically in response to a controller such as the electronic system 114, the controller 460, the processor(s) 604, and/or the control system 609, and/or the like.

The emergency braking process 500 may include actuating the emergency braking process 510. In particular, the actuating the emergency braking process 510 may include actuation of the emergency brake system 400 as described herein. For example, the actuating the emergency braking process 510 may include actuation of the emergency brake system 400 such as actuation of one or more of the actuation mechanism 430, the potential energy devices 412, brake components, the brake disk 402, the brake drum 404 and/or the like.

As may be appreciated by those skilled in the art, the illustrated implementation of the emergency braking process 500 is a logical structure and not a physical one. Accordingly, the emergency braking process 500 may implement modules that may be implemented by employing various hardware and software components. In addition, two or more of the logical components can be implemented as a single module that provides functionality for both components. In one aspect, the components are implemented as software program modules.

Figure 13:
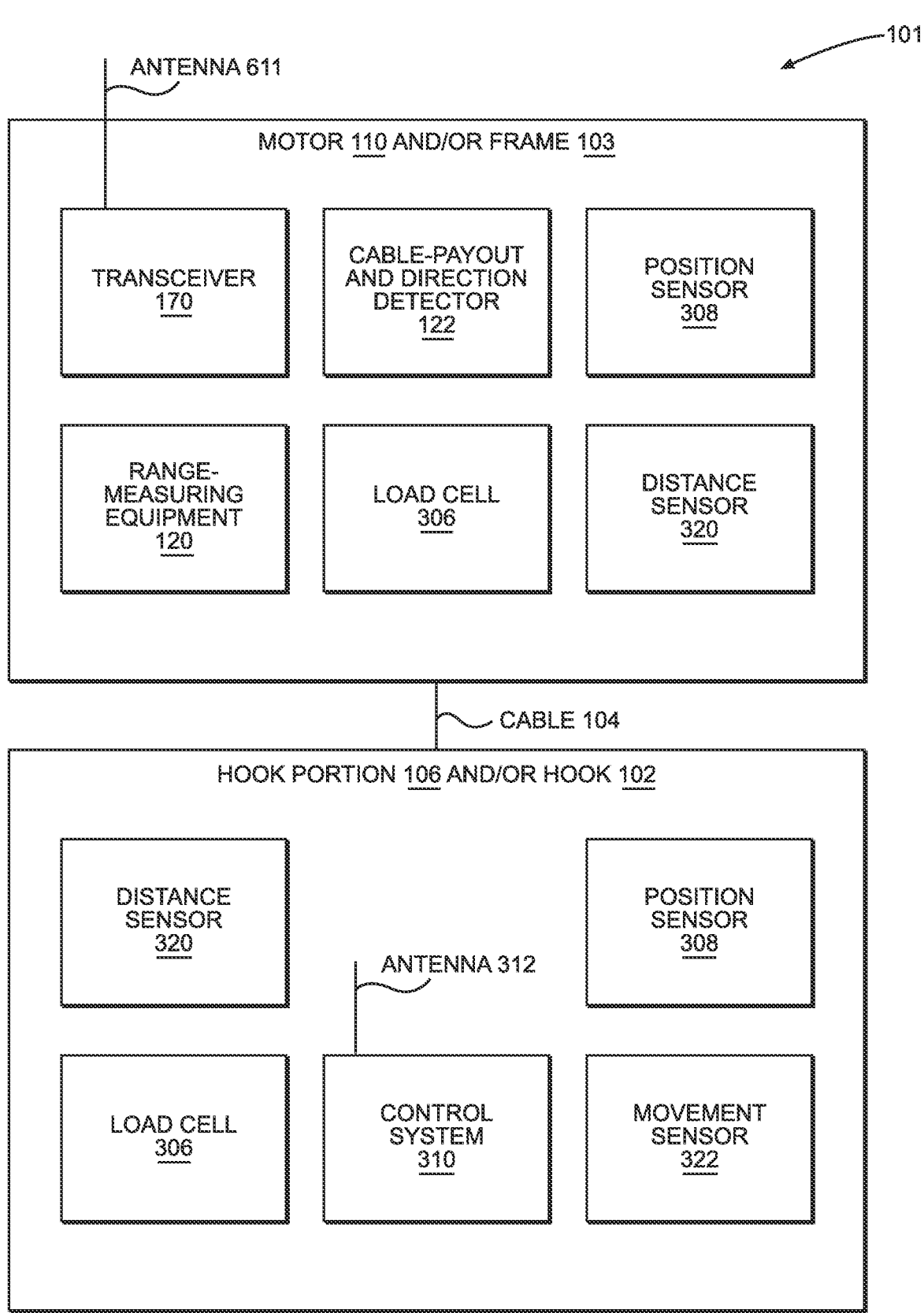
FIG. 13 illustrates a block diagram illustrating select components of an example helicopter hoist system in accordance with aspects of the disclosure.

FIG. 13 illustrates a block diagram illustrating select components of an example helicopter hoist system in accordance with aspects of the disclosure.

The hoist system 101 and/or the emergency brake system 400 may include one or more sensors to measure a load on the cable 104, the hook portion 106, and/or the hook 102. In one aspect, the hoist system 101 may include a load cell 306 associated with the motor 110, the frame 103, and/or the like. In one aspect, the load cell 306 may be integrated in the hook 102 and/or the hook portion 106. However, the one or more sensors to measure a load on the cable 104, the hook portion 106, and/or the hook 102 may be implemented using other sensor technology and/or arranged in other locations.

The load cell 306 may be implemented as a transducer that is used to create an electrical signal whose magnitude is directly proportional to or a function of the force being measured. The load cell 306 may be implemented as a hydraulic, a pneumatic, and/or a strain gauge load cell. The load cell 306 measures a force provided by the load. That is, the load cell 306 is positioned in a load path associated with the hook 102, the hook portion 106, and/or cable 104. As appreciated by one skilled in the art after having the benefit of this disclosure, the load cell 306 can have any construction and be positioned in hook 102, the hook portion 106, along the cable 104, the motor 110, the frame 103, and/or the like in any suitable manner to acquire load data.

The hoist system 101 and/or the emergency brake system 400 may include one or more sensors to measure a movement of the cable 104, the hook portion 106, and/or the hook 102 with respect to the helicopter 100. In one aspect, the hoist system 101 may include the position sensor 308 associated with the motor 110, the frame 103, the cable 104, the hook portion 106, the hook 102, and/or the like. The position sensor 308 may be implemented as capacitive transducer, capacitive displacement sensor, eddy-current sensor, ultrasonic sensor, grating sensor, hall effect sensor, inductive non-contact position sensors, laser doppler vibrometer (optical), linear variable differential transformer (LVDT), multi-axis displacement transducer, photodiode array, piezo-electric transducer (piezo-electric), potentiometer, proximity sensor (optical), rotary encoder (angular), string potentiometer, string encoder, cable position transducer, linear encoder, rotary encoder, and/or the like.

The hoist system 101 may include one or more sensors to measure a length or distance of the cable 104, the hook portion 106, and/or the hook 102 from the helicopter 100. In one aspect, the hoist system 101 may include a distance sensor 320 associated with the motor 110, the frame 103, the cable 104, the hook portion 106, the hook 102, and/or the like. In one aspect, the hoist system 101 may associate the distance sensor 320 with the motor 110 and measure rotations of the motor 110 to determine a length of the cable 104 or the like. In one aspect, the hoist system 101 may associate the distance sensor 320 with the motor 110 and determine a length of the cable 104 payout or the like. The distance sensor 320 may be implemented as capacitive transducer, capacitive displacement sensor, eddy-current sensor, ultra-sonic sensor, grating sensor, hall effect sensor, inductive non-contact position sensors, laser doppler vibrometer (opti-cal), linear variable differential transformer (LVDT), multi-axis displacement transducer, photodiode array, piezo-elec-tric transducer (piezo-electric), potentiometer, proximity sensor (optical), rotary encoder (angular), string potentiom-eter, string encoder, cable position transducer, linear encoder, rotary encoder, and/or the like.

In one aspect, the hoist system 101 may also include range-measuring equipment 120 (such as a laser-range finder) for determining the distance of the hook 102 from the helicopter 100, and as well as the distance of objects or ground/water from helicopter 100. In one aspect, the hoist system 101 may also include the cable-payout and direction detector 122, which measures the distance the cable 104 is extended and a direction the cable 104 is moving (i.e., up or down).

In some aspects, the hook 102 may include a control system 310. The control system 310 may be configured to measure and transmit the load on the hook, altitude of the assembly above ground or water, position and/or direction-ality of the assembly, and/or other information utilizing sensors as described above or other types of sensors known to one of ordinary skill in the art. In some aspects, the load and sensor data may be stored in any suitable-memory-storage device within hook 102. In one aspect, an antenna 312 together with the transceiver serves as a means for communicating wirelessly between the control system 310 and other systems located in helicopter 100 or elsewhere utilizing a communication channel as defined herein. A data port may also serve as a means for communicating with other computing devices including memory storage devices.

FIG. 14 illustrates a block diagram illustrating select components of an example helicopter hoist system in accor-dance with aspects of the disclosure.

In particular, FIG. 14 is a block diagram illustrating select components of the hoist system 101 and/or the emergency brake system 400 that facilitate the interoperability of the hoist system 101. As shown in FIG. 14, the hoist system 101 may include the control system 609, which may control and monitor the emergency brake system 400, the hook 102, and/or other systems/devices associated with the hoist sys-tem 101 as described in the disclosure.

Although the control system 609 is illustrated as a discrete block, it is appreciated by those skilled in the art with the benefit of this disclosure, that the control system 609 may reside at various times across different components of the hoist system 101. For instance, the control system 609 may be implemented and reside as a component of the hook 102, may be also be implemented and reside in the electronic system 114, across other devices remote from the hook 102 and the electronic system 114, and/or the like.

Thus, in a general sense, those skilled in the art will recognize that the various control systems described in the hoist system 101 can be implemented individually or col-lectively by a wide range of electrical, mechanical, optical, processing (including hardware, software, firmware, and/or virtually any combination thereof), and various combina-tions of the foregoing.

Furthermore, various elements located in the hook 102 may communicate via antenna 312 in the hook 102 with the emergency brake system 400, components resident in the electronic system 114, and/or other component remote from the electronic system 114, such as located in the helicopter 100. An antenna 611 implemented with a transceiver 170 associated with the hoist system 101 may provide a mecha-nism for transmitting and receiving data to/from the hook 102, and other devices. Thus, even though the control system 310 is shown apart from the control system 609, it is appreciated by those skilled in the art with the benefit of this disclosure that the control system 310 may form an integral part of the control system 609 for the hoist system 101. In addition, although wireless communication via antennae is described, it is appreciated that wired communication may be used between the hook 102 and other elements of the hoist system 101.

As depicted in FIG. 14, the control system 609 represents any suitable computer device(s) having the one or more processor(s) 604 and the ability to access the computer-readable media 606 to execute instructions or code that controls the hook 102, as well as other devices associated with the hoist system 101. The processor(s) 604 may be located in the electronic system 114 and may be embodied as any suitable electrical circuit, computing processor including special integrated circuits, ASICs, FPGAs, micro-controllers, processor, co-processor, microprocessor, con-trollers, or other processing means. The processor(s) 604 may also be embedded in the hook 102.

The processor(s) 604 may be distributed in more than one computer system and over a network utilizing a transceiver operating on a communication channel as defined herein (not shown). Examples of the computer systems may include, but are not limited to, a server, personal computer, distributed computer systems, or other computing devices having access to processors and computer-readable medial. Further, although not shown, any number of system busses, communication and peripheral interfaces, input/output devices, and other devices may be included in the control system 609 (including the control system 310), as appreci-ated by those skilled in the art.

Still referring to FIG. 14, the computer-readable media 606 may include any suitable computer-storage media including volatile and non-volatile memory, and any com-bination thereof. For example, computer storage media includes volatile and non-volatile, removable and non-re-movable media implemented in any method or technology for storage of information such as computer readable instructions, data structures, program modules, or other data. Computer storage media may further include, but is not limited to, RAM, ROM, EEPROM, flash memory or other memory technology, CD-ROM, digital versatile disks (DVD) or other optical storage, magnetic cassettes, mag-netic tape, magnetic disk storage or other magnetic storage devices, or any other non-transitory or non-transmission medium that can be used to store information for access by a computing device. In one aspect, the computer-readable media 606 stores the emergency braking process 500 as described herein.

In other examples, the computer-readable media 606 may include communication media that may embody computer readable instructions, data structures, program modules, or other data in a modulated data signal, such as a carrier wave, or other transmission mechanism. In one aspect, the com-puter-readable media 606 may be implemented as a com-puter program product having instructions and configured to be executed by the control system 609 and/or the processor (s) 604.

Further, the computer-readable media 606 may be local and/or offsite to computer systems (not shown). For instance, one or more portions of, or all of data or code stored in the computer-readable media 606, may be accessed from a computer-storage medium local to and/or remote to the control system 609, such as from a storage medium connected to a network.

Resident in the computer-readable media 606 may be one or more operating systems (not shown), and any number of other program applications or modules in the form of computer-executable instructions and/or logic which are executed on the processor(s) 604 to enable processing of data or other functionality.

Still referring to FIG. 14, the control system 609 may be configured with a sensor-system-control module 608 that may be maintained in the computer-readable media 606. In one example, the sensor-system-control module 608 may be implemented as code in the form of computer-readable instructions that execute on the processor(s) 604. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application. Such code stored in the computer-readable media 606 may be implemented across one or more computers in a cloud computing environment, on a local device or system, or on a combination of both. The following discussion does not limit the implementation of code stored in the computer-readable media 606 to any particular device or environment.

The sensor-system-control module 608 may include components contained in the computer-readable media 606. In one example, the sensor-system-control module 608 may include a position/load module 612 and a display module 614.

In one aspect, the position/load module 612 facilitates a mode of operation of the control system 609 in which the position/load module 612 monitors measurements made by the emergency brake system 400, the load measurement sensors such as the load cell 306, the cable movement measurement sensors such as the distance sensor 320, the cable-payout and direction detector 122 and/or the range-measuring equipment 120, and/or the like. In one aspect, the position/load module 612 facilitates a mode of operation of the control system 609 in which the position/load module 612 monitors measurements made by an inertial measurement unit (IMU) and/or global positioning unit (GPS) (collectively referred to herein as IMU/GPS 602) located in the hook 102 and/or the electronic system 114. The position/load module 612 may also record these measurements (i.e., data) generated by the IMU/GPS 602, and transmit these measurements to the hoist system 101 as well as other monitoring devices, such as located in the helicopter 100.

Although FIG. 14 illustrates implementation of the control system 609, in one or more aspects, activation of the emergency brake system 400 may be implemented manually. In this aspect, the emergency brake system 400 may be implemented without the need for and/or without implementation of the electronic system 114, the controller 460, the one or more processor(s) 604, the control system 609, and/or the like.

Accordingly, the disclosure has provided a system and process to address situations where portions of the lifting device may slip responsive to mechanical systems attempting to address various load forces. In particular, the disclosure has set forth a system and process to stop slipping of a lifting device to ensure safe operation of the aircraft and a safety of the load. More specifically, the disclosure has provided details of the emergency brake system 400 such that a pilot and/or a crew can operate the manual control 470 to ensure safety of the load, the helicopter 100, and/or the like. Operation of the emergency brake system 400 may be in conjunction with a system and process to provide slip detection information to a pilot, a crew, a helicopter system, and/or the like to ensure safe operation of the aircraft and a safety of the load.

The following are a number of nonlimiting Examples of aspects of the disclosure. One example includes a hoist system that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; and where the emergency brake system includes brake components.

The above-noted Example may further include any one or a combination of more than one of the following aspects. The hoist system where the brake components are connected directly or indirectly to a cable storage drum. When the emergency brake system is actuated, the brake components prevent rotation of a cable storage drum. When the emergency brake system is actuated, the brake components engage to prevent rotation of a cable storage drum. The emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The emergency brake system includes potential energy devices configured to release potential energy in order energize operation of the brake components. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake components to stop movement of the cable. The preloaded compression springs are configured to release potential energy in order to stop movement of the cable. The brake components includes high friction features. The high friction features includes at least one of the following: serrations, ramps, or other non-planar structures. The emergency brake system includes potential energy devices configured to release potential energy in order energize operation of brake components; and where the actuation mechanism is configured to operate the potential energy devices and release the potential energy of the potential energy devices to apply a braking energy to the cable. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

One example includes a hoist system that includes a hook; a cable connected to the hook; a motor configured to move the hook and the cable; an overload protection device (OLPD) configured to limit loads imparted on one or more of the hook, the cable, and the motor; and an emergency brake system configured to stop movement of at least the cable, where the emergency brake system is configured to operate in response to one of the following: a manual control or automatically in response to a controller.

The above-noted Example may further include any one or a combination of more than one of the following aspects. The hoist system where the emergency brake system includes a brake disk and a brake drum. The brake drum is connected directly or indirectly to a cable storage drum. When the emergency brake system is actuated, the brake disk prevents rotation of a cable storage drum. When the emergency brake system is actuated, the brake disk engages the brake drum to prevent rotation of the brake drum and prevent rotation of a cable storage drum. The emergency brake system includes potential energy devices configured to release potential energy in order energize operation of the brake disk to engage the brake drum. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake disk to engage the brake drum to stop movement of the cable. The preloaded compression springs are configured to release potential energy in order to stop movement of the cable. The brake disk includes high friction features. The high friction features includes at least one of the following: serrations, ramps, or other non-planar structures. The emergency brake system includes potential energy devices configured to release potential energy in order energize operation of the brake disk to engage the brake drum; and where the actuation mechanism is configured to operate the potential energy devices and release the potential energy of the potential energy devices to apply a braking energy to the cable. The emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

One example includes a hoist system that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; where the emergency brake system includes brake components; where the brake components are connected directly or indirectly to a cable storage drum; and where when the emergency brake system is actuated, the brake components prevent rotation of a cable storage drum.

The above-noted Example may further include any one or a combination of more than one of the following aspects. The hoist system where the emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The emergency brake system includes potential energy devices configured to release potential energy in order energize operation of the brake components. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake components to stop movement of the cable. The preloaded compression springs are configured to release potential energy in order to stop movement of the cable. The brake components includes high friction features. The high friction features includes at least one of the following: serrations, ramps, or other non-planar structures. The emergency brake system includes potential energy devices configured to release potential energy in order energize operation of brake components; and where the actuation mechanism is configured to operate the potential energy devices and release the potential energy of the potential energy devices to apply a braking energy to the cable. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

One example includes a hoist system process that includes providing a hook; providing a cable connected to the hook; providing a motor configured to move the hook and the cable; limiting loads imparted on one or more of the hook, the cable, and the motor with an overload protection device (OLPD); and stopping movement of at least the cable with an emergency brake system, where the emergency brake system is configured to operate in response to one of the following: a manual control or automatically in response to a controller; and where the emergency brake system includes brake components.

The above-noted Example may further include any one or a combination of more than one of the following aspects. The hoist system process where the brake components are connected directly or indirectly to a cable storage drum. When the emergency brake system is actuated, the brake components prevent rotation of a cable storage drum. When the emergency brake system is actuated, the brake components engage to prevent rotation of a cable storage drum. The emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The emergency brake system includes potential energy devices configured to release potential energy in order energize operation of the brake components. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake components to stop movement of the cable. The preloaded compression springs are configured to release potential energy in order to stop movement of the cable. The brake components includes high friction features. The high friction features includes at least one of the following: serrations, ramps, or other non-planar structures. The emergency brake system includes potential energy devices configured to release potential energy in order energize operation of brake components; and where the actuation mechanism is configured to operate the potential energy devices and release the potential energy of the potential energy devices to apply a braking energy to the cable. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

One example includes a hoist system process that includes providing a hook; providing a cable connected to the hook; providing a motor configured to move the hook and the cable; limiting loads imparted on one or more of the hook, the cable, and the motor with an overload protection device (OLPD); and stopping movement of at least the cable with an emergency brake system, where the emergency brake system is configured to operate in response to one of the following: a manual control or automatically in response to a controller.

The above-noted Example may further include any one or a combination of more than one of the following aspects. The hoist system process where the emergency brake system includes a brake disk and a brake drum. The brake drum is connected directly or indirectly to a cable storage drum. When the emergency brake system is actuated, the brake disk prevents rotation of a cable storage drum. When the emergency brake system is actuated, the brake disk engages the brake drum to prevent rotation of the brake drum and prevent rotation of a cable storage drum. The emergency brake system includes potential energy devices configured to release potential energy in order energize operation of the brake disk to engage the brake drum. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake disk to engage the brake drum to stop movement of the cable. The preloaded compression springs are configured to release potential energy in order to stop movement of the cable. The brake disk includes high friction features. The high friction features includes at least one of the following: serrations, ramps, or other non-planar structures. The emergency brake system includes potential energy devices configured to release potential energy in order energize operation of the brake disk to engage the brake drum; and where the actuation mechanism is configured to operate the potential energy devices and release the potential energy of the potential energy devices to apply a braking energy to the cable. The emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

One example includes a hoist system process that includes a hook; a cable connected to the hook; a motor configured to move the hook and the cable; an overload protection device (OLPD) configured to limit loads imparted on one or more of the hook, the cable, and the motor; an emergency brake system configured to stop movement of at least the cable, where the emergency brake system is configured to operate in response to one of the following: a manual control or automatically in response to a controller; where the emergency brake system includes brake components; where the brake components are connected directly or indirectly to a cable storage drum; and where when the emergency brake system is actuated, the brake components prevent rotation of a cable storage drum.

The above-noted Example may further include any one or a combination of more than one of the following aspects. The hoist system process where the emergency brake system is configured to operate in response the manual control, and where the manual control is configured to be implemented with one of the following: a dual action redundancy and a triple action redundancy. The emergency brake system is configured to operate only when at least one of the following conditions is met: a hoist load is detected and an aircraft flight is detected. The emergency brake system includes potential energy devices configured to release potential energy in order energize operation of the brake components. The potential energy devices includes at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, and solenoid devices. The potential energy devices includes preloaded compression springs. The preloaded compression springs are configured to release potential energy in order energize operation of the brake components to stop movement of the cable. The preloaded compression springs are configured to release potential energy in order to stop movement of the cable. The brake components includes high friction features. The high friction features includes at least one of the following: serrations, ramps, or other non-planar structures. The emergency brake system includes potential energy devices configured to release potential energy in order energize operation of brake components; and where the actuation mechanism is configured to operate the potential energy devices and release the potential energy of the potential energy devices to apply a braking energy to the cable. The controller is configured with test circuitry that is configured to perform at least one of the following: confirm electrical wiring, confirm electrical connections, simulate operation, and test continuities. The controller is configured with test circuitry that is configured to test operational readiness of the emergency braking system.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time.

A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum The many features and advantages of the disclosure are apparent from the detailed specification, and, thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

The invention claimed is:

1. A hoist system comprising:
a hook;
a cable connected to the hook;
a motor configured to move the hook and the cable;
an overload protection device (OLPD) configured to slip at a certain torsional range and allow the cable to reel out in order to limit loads imparted on one or more of the hook, the cable, and the motor; and
an emergency brake system configured to stop movement of at least the cable,
wherein the overload protection device (OLPD) comprises an OLPD activation sensor configured to generate an activation signal;
wherein the emergency brake system is configured to be actuated by an actuation mechanism in response to one of the following: a manual control by a pilot and/or a crew in response to the activation signal or automatically by a controller in response to the activation signal; and wherein the emergency brake system includes brake components;

wherein the overload protection device (OLPD) is configured to receive a torque from the motor and at the certain torsional range, the Overload Protection Device (OLPD) prevents torque from being delivered to the cable; and wherein the emergency brake system is configured to operate only when aircraft flight is detected.

2. The hoist system according to claim 1 wherein the emergency brake system comprises a brake disk and a brake drum;

wherein the brake drum is attached to a cable storage drum;

wherein the brake disk is configured to engage the brake drum to prevent rotation of the cable storage drum; and wherein a torque from the motor is delivered to the cable storage drum through the Overload Protection Device (OLPD).

3. The hoist system according to claim 1 wherein when the emergency brake system is actuated, the brake components prevent rotation of a cable storage drum;

wherein the motor is configured to provide torque through a first transmission portion of a reduction gearing to a load control brake assembly;

wherein the torque from the motor is configured to drive a second transmission portion of the reduction gearing and deliver the torque from the motor to the cable storage drum through the Overload Protection Device (OLPD); and wherein the overload protection device (OLPD) comprises at least one electrically activated clutch.

4. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD);

wherein the brake components comprise one or more brake shoes, brake pads, brake discs, and/or brake caliper; and wherein when the emergency brake system is actuated, the brake components engage to prevent rotation of the cable storage drum.

5. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD);

wherein the emergency brake system is configured to operate in response the manual control; and wherein the manual control is configured to be implemented with one of the following: a dual action redundancy or a triple action redundancy.

6. The hoist system according to claim 1 wherein the motor is configured to provide torque through a load control brake assembly and the Overload Protection Device (OLPD) to rotate a cable storage drum;

wherein the motor is configured to provide torque through a first transmission portion of a reduction gearing to the load control brake assembly;

wherein the torque from the motor is configured to drive a second transmission portion of the reduction gearing and deliver the torque from the motor to the cable storage drum through the Overload Protection Device (OLPD); and wherein the emergency brake system comprises potential energy devices configured to release potential energy in order energize operation of the brake components.

7. The hoist system according to claim 6 wherein the emergency brake system is configured and implemented separate from the load control brake assembly;

wherein the brake components comprise one or more brake shoes, brake pads, brake discs, and/or brake calipers; and wherein the potential energy devices comprise at least one of the following: springs, compression springs, preloaded springs, preloaded compression springs, pneumatic pressure, pneumatic devices, preloaded pneumatic devices, hydraulic pressure, hydraulic devices, preloaded hydraulic devices, electrical devices, electromagnetic devices, or solenoid devices.

8. The hoist system according to claim 6 wherein the emergency brake system comprises a brake disk and a brake drum; and wherein the potential energy devices comprise preloaded compression springs.

9. The hoist system according to claim 8 wherein the brake disk is configured to engage the brake drum to prevent rotation of the cable storage drum; and wherein the preloaded compression springs are configured to release potential energy in order to energize operation of the brake components to stop movement of the cable.

10. The hoist system according to claim 8 wherein the brake drum is attached to the cable storage drum; and wherein the preloaded compression springs are configured to release potential energy in order to stop movement of the cable.

11. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD);

wherein the load control brake assembly comprises a sprag clutch; and wherein the brake components comprise materials and/or features to induce friction.

12. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD);

wherein the brake components comprise one or more brake shoes, brake pads, brake discs, and/or brake calipers; and wherein the brake components comprise high friction features that comprise at least one of the following: serrations, ramps, or other non-planar structures.

13. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD);

wherein the actuation mechanism comprises at least one of the following: an electrical actuation mechanism, a pyrotechnic actuation mechanism, or non-explosive instantaneous actuation mechanism;

wherein the emergency brake system comprises potential energy devices configured to release potential energy in order energize operation of brake components; and wherein the actuation mechanism is configured to operate the potential energy devices and release a potential energy of the potential energy devices to apply a braking energy to the cable.

14. The hoist system according to claim 1 wherein the motor is configured to provide torque through a load control brake assembly and the Overload Protection Device (OLPD) to rotate a cable storage drum;

wherein the motor is configured to provide torque through a first transmission portion of a reduction gearing to the load control brake assembly;

wherein the torque from the motor is configured to drive a second transmission portion of the reduction gearing and deliver the torque from the motor to the cable storage drum through the Overload Protection Device (OLPD); and wherein the controller is configured with test circuitry that is configured to perform at least one of the following: confirm electrical wiring, confirm electrical connections, simulate operation, or test continuities.

15. The hoist system according to claim 1 wherein the motor is configured to provide torque through a first transmission portion of a reduction gearing to a load control brake assembly;

wherein the torque from the motor is configured to drive a second transmission portion of the reduction gearing and deliver the torque from the motor to a cable storage drum through the Overload Protection Device (OLPD); and wherein the controller is configured with test circuitry that is configured to test operational readiness of the emergency braking system.

* * * * *